(12) United States Patent
Roser et al.

(10) Patent No.: US 6,978,222 B2
(45) Date of Patent: Dec. 20, 2005

(54) METHOD OF DETERMINING LEVEL OF EFFECT OF SYSTEM ENTITY ON SYSTEM PERFORMANCE, BY USE OF ACTIVE TIME OF SAME ENTITY

(75) Inventors: Christoph Hermann Roser, Aichi-gun (JP); Masaru Nakano, Aichi-gun (JP); Minoru Tanaka, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 400 days.

(21) Appl. No.: 10/103,809

(22) Filed: Mar. 25, 2002

(65) Prior Publication Data

US 2002/0143497 A1 Oct. 3, 2002

(30) Foreign Application Priority Data

Mar. 29, 2001 (JP) ........................................ 2001-097640
Oct. 10, 2001 (JP) ........................................ 2001-313133

(51) Int. Cl.$^7$ ................................................ G06F 11/30
(52) U.S. Cl. ........................... 702/182; 702/186; 703/2; 700/99; 700/108
(58) Field of Search ................................ 702/186, 182; 703/2; 700/99, 108

(56) References Cited

U.S. PATENT DOCUMENTS

| | | | | |
|---|---|---|---|---|
| 5,229,948 A | * | 7/1993 | Wei et al. ...................... 700/99 |
| 5,351,202 A | * | 9/1994 | Kurtzberg et al. ............. 702/81 |
| 5,446,671 A | * | 8/1995 | Weaver et al. ............... 700/100 |
| 5,479,361 A | * | 12/1995 | Kurtzberg et al. ............. 702/84 |
| 5,546,329 A | * | 8/1996 | Kurtzberg et al. ............. 702/83 |
| 5,636,144 A | * | 6/1997 | Kurtzberg et al. ............. 702/81 |
| 5,838,565 A | * | 11/1998 | Hsieh et al. ................... 700/11 |
| 5,880,960 A | * | 3/1999 | Lin et al. ....................... 700/99 |
| 5,946,661 A | * | 8/1999 | Rothschild et al. ............. 705/7 |
| 5,966,694 A | * | 10/1999 | Rothschild et al. ............. 705/7 |
| 6,259,959 B1 | * | 7/2001 | Martin ......................... 700/99 |
| 6,473,721 B1 | * | 10/2002 | Chacon et al. ............... 702/182 |
| 6,564,113 B1 | * | 5/2003 | Barto et al. .................... 700/99 |

* cited by examiner

*Primary Examiner*—John Barlow
*Assistant Examiner*—A. Dougherty
(74) *Attorney, Agent, or Firm*—Oblon, Spivak, McClelland, Maier & Neustadt, P.C.

(57) ABSTRACT

A method of determining the level of the effect of each system entity on the overall system performance, wherein the status of each entity at each one of discrete points of time is determined as the corresponding one of an active and an inactive status; the length of the active period in which each entity is situated without interruption in the active status is determined as an active time; and, on the basis of the relationship in magnitude between the system entities with respect to the determined active time, the level at which each entity affects the performance of the system is determined.

22 Claims, 24 Drawing Sheets

| MACHINE | TIME | STATUS | MACHINE | TIME | STATUS | MACHINE | TIME | STATUS |
|---|---|---|---|---|---|---|---|---|
| M2 | 500.83 | 1 | M3 | 2051.81 | 0 | M2 | 3824.22 | 1 |
| M2 | 507.51 | 0 | M1 | 2247.56 | 0 | M1 | 4108.22 | 0 |
| M1 | 803.76 | 0 | M1 | 2248.86 | 0 | M1 | 4155.23 | 0 |
| M2 | 839.55 | 3 | M2 | 2292.09 | 0 | M2 | 4161.00 | 0 |
| M2 | 926.46 | 0 | M1 | 2296.09 | 0 | M3 | 4254.25 | 2 |
| M3 | 1131.25 | 2 | M2 | 2449.38 | 2 | M3 | 4312.62 | 0 |
| M2 | 1429.32 | 0 | M2 | 2463.47 | 0 | M3 | 4484.12 | 0 |
| M3 | 1480.48 | 0 | M2 | 2633.26 | 3 | M1 | 4491.37 | 1 |
| M2 | 1534.14 | 3 | M1 | 2800.22 | 0 | M1 | 4676.00 | 0 |
| M2 | 1621.92 | 0 | M1 | 2952.75 | 1 | M3 | 4847.93 | 1 |
| M2 | 1637.48 | 0 | M1 | 3001.22 | 0 | M3 | 5131.79 | 0 |
| M3 | 1776.54 | 0 | M3 | 3194.47 | 1 | M3 | 5377.56 | 0 |
| M1 | 1803.99 | 0 | M1 | 3356.31 | 0 | M3 | 5382.11 | 3 |
| M1 | 1888.20 | 2 | M3 | 3412.67 | 0 | M2 | 5527.55 | 0 |
| M3 | 1927.83 | 0 | M2 | 3537.85 | 0 | M1 | 5536.00 | 2 |
| M3 | 1938.73 | 2 | M1 | 3548.16 | 0 | M1 | 5585.46 | 0 |

FIG.2

$$X = \{x_1, x_2, \ldots, x_i, \ldots, x_n,\} \quad \cdots (1)$$

$$E[X] = \frac{\sum_{i=1}^{n} x_i}{n} \quad \cdots (2)$$

$$S[X] = \sqrt{\frac{\sum_{i=1}^{n}(x_i - E[X])^2}{n-1}} \quad \cdots (3)$$

$$CI[X] = z_{n-1,(1-a)/2} \cdot \frac{S[X]}{\sqrt{n}} \quad \cdots (4)$$

FIG.5

| MACHINE | PERCENTAGE WORKING TIME | 95%CI | LOWEST VALUE OF VARIATION | HIGHEST VALUE OF VARIATION | BOTTLENECK |
|---|---|---|---|---|---|
| M1 | 53.0% | 0.90% | 52.11% | 53.91% | |
| M2 | 93.3% | 1.69% | 91.63% | 95.01% | ○ |
| M3 | 95.1% | 2.12% | 92.94% | 97.17% | ◎ |
| M4 | 60.2% | 1.24% | 58.97% | 61.45% | |
| M5 | 92.1% | 2.67% | 89.39% | 94.73% | ○ |
| M6 | 59.8% | 2.01% | 57.75% | 61.77% | |
| M7 | 81.7% | 2.62% | 79.10% | 84.34% | |

| MACHINE | AVERAGE ACTIVE TIME | 95%CI | LOWEST VALUE OF VARIATION | HIGHEST VALUE OF VARIATION | BOTTLENECK |
|---|---|---|---|---|---|
| M1 | 30 | 0 | 30 | 30 | |
| M2 | 1406 | 325 | 1,081 | 1,731 | |
| M3 | 2819 | 776 | 2,043 | 3,594 | ○ |
| M4 | 104 | 1 | 102 | 105 | |
| M5 | 720 | 182 | 538 | 902 | |
| M6 | 34 | 1 | 33 | 35 | |
| M7 | 153 | 15 | 138 | 167 | |

FIG.6

McCain# METHOD OF DETERMINING LEVEL OF EFFECT OF SYSTEM ENTITY ON SYSTEM PERFORMANCE, BY USE OF ACTIVE TIME OF SAME ENTITY This application is based on Japanese Patent Applications No. JP2001-097640 filed Mar. 29, 2001 and No. JP2001-313133 filed Oct. 10, 2001, the contents of which are incorporated hereinto by reference.

CROSS-REFERENCE TO RELATED APPLICATIONS

Not Applicable.

BACKGROUND OF THE INVENTION

1. Field of the Invention

The present invention relates to a technology of determining the level of the effect of each one of a plurality of entities constructing a system on the performance thereof, wherein the status of each entity changes with time.

2. Description of the Related Art

In many systems, it is of interest to control the throughput of each system, usually in order to maximize the throughput. For example, in a manufacturing system, it may be of interest to maximize the number of products or parts produced within a certain time.

The throughput of a real system, however, is always finite. While many factors in a system affect the throughput, it is usually only a few entities (e.g., processing entities such as machines, transporting devices, processors of a computer, etc.) in a system limiting the throughput.

These limiting entities in a system are commonly called bottlenecks or constraints. These bottlenecks or constraints limit the overall flow of a discrete event system constructed with entities. Each entity constructing a system is a material, a human, or an abstract element, as for example as a machine, a worker, an order, information, etc.

Subsequently, in order to change the system throughput, it is necessary to change the throughput of the one or more bottlenecks. Adjusting non-bottleneck entities will usually have little or no effect on the throughput.

Consequently, it is important to determine the effect-level at which each entity constructing a system affects the performance or throughput of the system, and to detect, on the basis of the thus determined effect-level, one or more entities of the system as one or more bottlenecks.

Currently, a number of different methods for detecting the bottleneck are in use. One commonly used method is to determine the busiest entity, i.e., the entity that has the largest percentage working time, and eventually has the smallest percentage idle time.

In this conventional method, as illustrated with a flow chart in FIG. 27, step S101 is first implemented to collect data required for determining the bottleneck of a system, and step S102 is then implemented to measure the percentage working time of each one of entities constructing the system. Step S103 is thereafter implemented to order the entities by the measured percentage working time, and step S104 is then implemented to determine that one or more entities with the largest percentage working time is one or more bottlenecks of the system.

BRIEF SUMMARY OF THE INVENTION

Our detailed analysis of the meaning of the bottleneck of a system has revealed that the bottleneck is one of the entities constructing the system, which hinders the potential throughput of another entity, and which is kept active for the longest time because the present entity itself does not have a sufficient processing capacity.

Contrary to the above findings, the conventional method described above does not permit a direct consideration of an active time in which each entity is kept active without interruption, and unavoidably permit an indirect consideration of the above active time in the form of a percentage working time, as calculated by dividing the sum of working times of each entity by the overall operation time of the system.

For this reason, the above conventional method would provide a large percentage working time for an entity, even in the case where the entity fails to be deemed as such an entity that has been kept active without interruption for a long time, such as the case where the entity shows a frequently iterated shifting between an active and an inactive status alternatively.

As a result, the above conventional method has difficulties in clearly distinguishing between the entity truly being the bottleneck, and the entity which is not truly the bottleneck and which shows a frequently iterated shifting between an active and an inactive status alternatively, because this conventional method employs the percentage working time that fails to sensitively reflect the strength level at which each entity functions is the bottleneck.

Thus, using the above conventional method it is essentially difficult to detect an entity truly functioning as the bottleneck.

Another conventional method to detect the bottleneck is the analysis of the queue in front of a processing entity (e.g., a machine), wherein the queue is a line of processed objects waiting for them to be processed by the processing entity.

A first variant of the another conventional method is implemented, such that the queue length, i.e., the average of the number of processed objects waiting is calculated for each one of entities constructing a system, and subsequently the maximum of the thus calculated averages for these entities is detected as the longest average queue length.

In the first variant described above, the entity with the longest average queue length is deemed to be the bottleneck of the system. This, however, is not always true. If, for example, an entity is processing parts, i.e., processed objects at a faster rate than other entities, a longer queue (that is, a larger number of processed objects waiting) does not necessarily mean that this entity is the bottleneck.

A second variant of the another conventional method, which is to detect the bottleneck by means of the analysis of the queue, as described before, is implemented, such that the entity with the maximum waiting time, i.e., the entity where the processed objects have to wait for the longest time before they are processed, is detected as the bottleneck. However, this second variant also suffers problems.

A first one of the problems results from the structure of the system. In many cases, a buffer for storing processed objects in front of an entity is limited, setting the maximum queue length to the buffer size and subsequently limiting the waiting time. This, of course, invalidates the measures for the bottleneck detection.

Also, in many cases, one buffer stores part for more than one processing entity, or more than one buffer stores part for only one processing entity. In general, if one buffer is not uniquely assigned to only one entity, it is extremely difficult to determine which waiting time applies to which entity. For this reason, subsequent detection of the bottleneck is difficult to justify.

Another problem that the above second variant suffers is that usually the input of the system, i.e., the supply, does not have a queue. Yet, it is possible that the supply is actually the bottleneck of the system, where the system could process more objects if there would be more objects delivered. However, if the bottleneck is detected by analyzing the queues, a supply bottleneck will not be detected.

Furthermore, the supply may exceed the capacity of the system. In this case, the queue length or waiting time of queues may increase towards infinity. Therefore, subsequent detection of the bottleneck is difficult to justify.

Still another conventional method for bottleneck detection is a theoretical analysis of the system. Possible examples are a logical structure analysis and a queuing theory analysis. However, the applications of these approaches are usually complex. Most examples are limited to simple systems analyzed for academic research purposes. The practical use is limited due to the complexity of those methods, even for simple systems. In most cases, it is not economical to analyze real life systems using theoretical methods.

As will be readily understood from the above explanation, any one of those conventional methods described above is insufficient to accurately detect the bottleneck, even in a steady state system where the same one of the entities constructing the system is kept as the bottleneck irrespective of an elapse of time.

Further, these conventional methods are also insufficient to accurately detect the bottleneck in a non-steady state system where the bottleneck shifts with time between entities constructing a system. The reason will be described below.

The above non-steady state system is a system where its parameter changes over time. Here, the parameter include for example in the case of the system being a manufacturing line, a time required for manufacturing one product or part, and/or includes the kind of products or parts to be manufactured. A change in the parameter may accompany a shifting of the bottleneck from an entity to another entity in the system.

There exists a conventional method for detecting the bottleneck in such a non-steady state system. This method measures the aforementioned queue length in front of a processing entity, or alternatively measures the waiting time in front of the processing entity. The processing entity with the longest queue is considered to be the bottleneck. However, this method has many flaws.

First of all, many entities in a system do not have a queue, and therefore a queue length or waiting time cannot be measured. Even if there is a queue, the queue capacity is often limited and the resulting queue lengths or waiting times do not represent the real bottleneck.

Also, queue lengths fluctuate significantly over time, and the bottleneck detected according to the queue length may change very frequently for only very short periods of time. For this reason, this leads to difficulties in tracking the shifting bottleneck that qualifies as one of the entities of a system showing a shifting of the bottleneck, and accordingly this also causes occasionally incorrect results.

There is a system of the type where some processed objects, such as materials, parts, products, are bundled to form a batch (i.e., a group or a bundle) for thereby altogether processing these processed objects, and where a batch size meaning the number of processed objects belonging to each batch fluctuates over time. For example, a manufacturing system receives parts in large batch sizes (i.e., lot sizes), but then feeds parts on one by one through the system. In such a manufacturing system, the entity with a larger batch size is likely to have a temporary longer queue length even if the entity is not the bottleneck.

Overall, the measurement of the queue length or waiting time can be used only with limitations, and the resulting bottleneck may not be the true bottleneck.

It is therefore an object of the present invention to permit an accurate determination of the effect-level at which each one of entities constructing a system affects the performance of the system, wherein the status of each entity changes with time.

The object may be achieved according to any one of the following modes of the present invention. Each of these modes of the present invention is numbered, and depends from other mode or modes, where appropriate. This explanation about the present invention is for better understanding of some instances of a plurality of technological features and a plurality of combinations thereof disclosed in this specification, and does not mean that the plurality of technological features and the plurality of combinations in this specification are interpreted not to include ones other than the following modes of the present invention:

(1) A method of determining a level at which each one of a plurality of entities together constituting a system in which each one of the plurality of entities changes in status with time, affects a performance of the system, comprising:

a collecting step of collecting data representative of change in status of the each entity;

a qualifying step of qualifying, on the basis of the collected data, the status of the each entity at each one of discrete points of time, as a corresponding one of an active and an inactive status;

an active-time determining step of determining as an active time a length of an active period in which the each entity is situated without interruption in the active status; and an effect-level determining step of determining, on the basis of a relationship in magnitude between the plurality of entities with respect to the determined active time, the level at which the each entity affects the performance of the system.

The method according to this mode (1) is implemented, such that the level at which each entity affects the performance of the system is determined on the basis of the relationship in magnitude between the plurality of entities with respect to the active time during which each entity is situated without interruption in the active status.

In addition, as will be evident from the aforementioned definition of the bottleneck, employment of the length of the uninterrupted active period of each entity would make it easier to accurately determine the effect-level of each entity on the performance of the system.

On the other hand, as will be below described in detail, the above relationship in magnitude between the plurality of entities with respect to the active time represents more clearly the order in which the effect-levels of the plurality of entities on the performance of the system are ranked, than the relationship in magnitude between the plurality of entities with respect to the percentage working time which was referred to in the aforementioned conventional methods.

Consequently, the method according to this mode (1) would make it easier to accurately determine the effect-level of each entity on the performance of the system.

Additionally, the method according to this mode (1) would make it possible to avoid a strong dependency of the above relationship in magnitude between the plurality of entities with respect to the active time, upon random variation of data used for determining the effect-level of each entity on the performance of the system.

As a result, the method according to this mode (1), making it inessential to collect an increased amount of data required for mitigating the effects of the random variation of data required, would facilitate an accelerated determination of the effect-level of each entity on the performance of the system, with a reduced amount of data required.

The "collecting step" in this mode (1) may be, for example, of the type to collect from the system in operation data required, or the type to collect data required as a result of simulating the system with a computer.

The "effect-level of each entity on the performance of the system" in this mode (1) may be interpreted to mean, for example, the level at which each entity impedes or limits an improvement in performance of the system.

The method according to this mode (1) may be practiced in such a manner that all or part of the steps included in the method are implemented with a computer, or may be practiced in such a manner that all the steps are implemented by a worker without using a computer.

The "relationship in magnitude" in this mode (1) may be defined as one obtained by locally observing the status of each entity in association with a given point in time, or may be defined as one obtained by globally observing the statuses of each entity in association with a given period of time.

(2) The method according to the above mode (1), wherein the effect-level determining step is implemented to compare the plurality of entities with respect to the active time determined in the active-time determining step, and to determine, on the basis of results from the comparison, the effect-level of the each entity on the performance of the system.

(3) The method according to the above mode (1) or (2), wherein the system is a discrete event system.

(4) The method according to any one of the above modes (1) to (3), wherein the system is utilized to receive a plurality of processed objects, to manufacture a plurality of products by processing the received plurality of processed objects, and to deliver the manufactured plurality of products, and the plurality of entities comprise at least one of the following entities: a processing entity for processing each one of the plurality of processed objects; a transport entity for transporting the each processed object; a service entity for servicing another entity; a maintenance entity for maintaining another entity; and a storage entity for storing the each processed object.

(5) The method according to the above mode (4), wherein the processing entity is constructed as a machine.

(6) The method according to the above mode (5), wherein the machine is utilized for processing the each processed object.

(7) The method according to any one of the above modes (4) to (6), wherein the performance is defined with a number of products manufactured in the system within a given time.

(8) The method according to any one of the above modes (1) to (7), wherein the effect-level determining step comprises a bottleneck determining step of determining at least one of the plurality of entities as at least one bottleneck which affects the performance of the system at a higher level than other entities.

The method according to this mode (8) would determine the effect-level of each entity on the performance of the system, according to the standard for determining whether or not each entity functions as the bottleneck of the system.

(9) The method according to the above mode (8), wherein the bottleneck determining step comprises a step of determining one of the plurality of entities that has the longest active time among the plurality of entities, as one bottleneck affecting the performance of the system more strongly than other entities.

(10) The method according to the above mode (8), wherein the bottleneck determining step comprises a step of determining at least one of the plurality of entities that has the active time in the vicinity of the longest active time among the plurality of entities, as at least one bottleneck affecting the performance of the system more strongly than other entities.

A system has not always only one bottleneck. In addition, at least one of a plurality of entities constituting a system that has the active time in the vicinity of the longest active time among the plurality of entities is all likely to qualify as at least one bottleneck of the system.

Based on the above findings, the method according to this mode (10) is implemented, such that at least one of the plurality of entities that has the active time in the vicinity of the longest active time among the plurality of entities are determined as at least one bottleneck affecting the performance of the system more strongly than other entities.

Consequently, the method according to this mode (10) would facilitate detection of all the at least one of the plurality of entities that is likely to qualify as at least one real bottleneck of the system.

(11) The method according to any one of the above modes (8) to (10), wherein the system is of a steady type in which the same at least one of the plurality of entities is kept qualifying as the at least one bottleneck of the system as time elapses.

The method according to this mode (11) would make it possible to determine at least one bottlenecks in a steady state system where the same at least one of the plurality of entities is kept qualifying as the at least one bottleneck of the system as time elapses.

(12) The method according to any one of the above modes (8) to (10), wherein the system is of a type in which, while the system is in a steady state in which the same at least one of the plurality of entities is kept qualifying as the at least one bottleneck as time elapses, as long as no disturbance is applied to the system, the system is brought into a non steady state and is then temporally situated in the non steady state, in which the at least one bottleneck of the system shifts from a part of the plurality of entities to another part of the plurality of entities as time elapses, after a disturbance is applied into the system, and the bottleneck determining step is implemented to determine at least one of the plurality of entities as the at least one bottleneck while the system is in the steady state.

The method according to this mode (12) would make it possible to determine at least one bottleneck, while the system is in a steady state, where the system is of the type in which the system shifts from a steady state into a non steady state and is then temporally situated in the non steady state, in response to a disturbance applied to the system, and in which at least one bottleneck of the system shifts from a part of the plurality of entities to another part of the plurality of entities as time elapses. This will be below described in more detail.

In the case of the aforementioned conventional method, large sets of data are needed to determine the bottleneck with reasonable accuracy. Unfortunately, large sets of data are often time-consuming to obtain. If it takes a long time to determine the bottleneck, implementation of possible bottleneck improvements may have to wait until the bottleneck is detected. Thus, a less than optimal system has to be run for a long time, wasting resources in the process of the system.

Even a steady state system in which the bottleneck basically does not change from an entity to another entity as time elapses may be brought into a non steady state in which the bottleneck changes from an entity to another entity as time elapses, due to a disturbance applied into the system. For example, in a manufacturing line, new products are likely to be added to the schedule, and old products are likely to be removed from the schedule, possibly changing the bottleneck. In both of these situations, the bottleneck of the manufacturing line may change over time.

In such a system that may bear the above non steady state, large sets of data collected from the system irrespective of whether it is in the steady state or the non steady state are inappropriate to be used for accurately detecting the bottleneck. The reason is that the collected large sets of data contain different kinds of sets of data representative of different bottlenecks. This would create the concept of collecting data from the system only in the steady state, for thereby detecting the bottleneck.

However, with this concept, the amount of data available for detecting the bottleneck is likely to be less than data that could be obtained from a steady state system without non steady state.

On the other hand, the aforementioned conventional methods require large sets of data to mitigate variation in the percentage working time for an ensured accuracy in detecting the bottleneck.

For the above reasons, the conventional methods, requiring large sets of data, may either give no valid results at all, or the results may be obsolete by the time they become valid.

Alternately, the method according to this mode (12) would not greatly require a careful consideration of mitigation of variation in the active time, while the above conventional methods would greatly require a careful consideration of mitigation of variation in the percentage working time. Hence, the method according to this mode (12) would make it easier to accurately determine the bottleneck, even where available sets of data are smaller than ones of data required in the above conventional methods.

In addition, such a system that is brought into a temporary non steady state upon application of a disturbance into the system requires separated determinations of the bottleneck between in a steady state and in a non steady state. Data that could be obtained in the steady state is less than data that could be obtained in the non steady state. However, as described before, the method according to this mode (12) would make it easier to accurately determine the bottleneck even where available data is less in this method than data available in the aforementioned conventional methods.

Consequently, the method according to this mode (12) would facilitate an accurate determination of the bottleneck of such a system that is brought into a temporary non steady state upon application of a disturbance into the system.

It is added that such a system that is brought into a temporary non steady state upon application of a disturbance into the system, if the fact that the system possibly bears a steady state is focused on, may be categorized as a steady state system, and on the other hand, if the fact that the system possibly bears a non steady state is focused on, may be categorized as a non steady state system.

(13) The method according to any one of the above modes (8) to (12), wherein the active-time determining step comprises a representative-active-time determining step of determining, for the each entity, as a representative active time, a representative value of a plurality of active times of a plurality of active periods which are discrete in time, and the bottleneck determining step is implemented to determine, on the basis of a relationship in magnitude between the plurality of entities with respect to the determined representative active time, at least one of the plurality of entities which functions as the at least one bottleneck.

The method according to this mode (13) would permit the bottleneck to be determined by taking account of a representative value of the plurality of active times determined for a plurality of discrete active periods as a representative active time.

Consequently, the method according to this mode (13), in the case where the active time of each entity is varied between the plurality of active periods of the same entity, would prevent the variation in active time from affecting the level of accuracy at which the bottleneck is determined. The reason is that the representative value of the plurality of active times functions to absorb active time variation between different active periods of the same entity.

It follows that the method according to this mode (13) would make it easier to accurately determine the bottleneck irrespective of variation in active time.

(14) The method according to the above mode (13), wherein the representative active time comprises at least one of an arithmetic mean; a harmonic mean; and a median, of the plurality of active times.

(15) The method according to the above mode (13) or (14), wherein the effect-level determining step comprises an accuracy determining step of determining, for the each entity, an accuracy of the determined representative active time, and the bottleneck determining step is implemented to determine at least one of the plurality of entities which functions as the at least one bottleneck, on the basis of the determined accuracy and the determined representative active time.

Where a representative active time is determined for an entity, the accuracy of the determined representative active time for the same entity is not always equal to that for another entity.

In addition, where all the ones of the plurality of entities which are to be compared with each other with respect to the representative active time are adequately high in accuracy of the representative active time, it is effective to determine the bottleneck by focusing only on the representative active time.

However, where all the above ones are not adequately high in accuracy of the representative active time, if the bottleneck is determined by focusing only on the representative active time, it is possible to fail to detect the real bottleneck with certainty.

In view of the above findings, the method according to this mode (14) is implemented to determine the bottleneck of the system on the basis of the representative active time determined per entity and its accuracy.

Thus, the method according to this mode (14) would facilitate an ensured determination of the real bottleneck, by considering not only the length of the representative active time but also its accuracy.

(16) The method according to the above mode (15), wherein the accuracy comprises at least one of a confidence interval of the representative active time; and a standard deviation of the plurality of active times.

(17) The method according to any one of the above modes (1) to (16), wherein the effect-level determining step comprises a bottleneck determining step of determining at least one of the plurality of entities as at least one bottleneck which affects the performance of the system at a higher level than other entities at a given point in time.

Where the bottleneck of a system is likely to change from one of a plurality of entities constituting the system into another entity as time elapses, detection of a time-dependent change in the bottleneck, i.e., the shifting of the bottleneck is possibly needed. The shifting of the bottleneck can be detected by detecting the bottleneck not in association with a period of time but in association with a point in time.

In light of the above finding, the method according to this mode (17) is implemented to determine at least one of the plurality of entities which functions as the bottleneck at a give point in time.

Although it is needless to say that this method is effective where the system is a non steady state system bearing a non steady state in which the bottleneck changes over time, this method may be practiced where the system is a steady state system without bearing such a non steady state.

(18) The method according to any one of the above modes (1) to (16), wherein the effect-level determining step comprises a bottleneck determining step of determining, on the basis of a relationship in magnitude between the plurality of active times determined in the active-time determining step for the plurality of entities at each one of a plurality of discrete points of time, at least one of the plurality of entities which affects the performance of the system at a higher level than other entities, as at least one bottleneck.

The method according to this mode (18) would permit the bottleneck to be determined in association with each point in time.

(19) The method according to the above mode (17) or (18), wherein the bottleneck determining step is implemented, for at least one of the plurality of entities which is situated in the active status at the given point in time, such that at least one of the plurality of entities which functions as the at least one bottleneck is determined on the basis of a relationship in magnitude between the at least on active time determined in the active-time determining step.

Since it is not always that only one entity is in an active status at a given point in time, two or more entities may be in an active status at the same time. Where only one entity is active at a given point in time, it is automatically determined that the one entity functions as the bottleneck at the given point in time. However, where two or more entities are in active at a given point in time, it is possibly needed to determine the order in which these entities are ranked by the strength level at which each of these entities shows the qualification for the bottleneck.

In addition, it can be recognized that the more strongly each entity shows the qualification for the bottleneck, the longer the active time of each entity is.

In view of the above findings, the method according to this mode (19) is implemented, such that at least one of the plurality of entities which functions as at least one bottleneck is determined on the basis of a relationship in magnitude between the at least on active time determined for at least one of the plurality of entities which is situated in the active status at the given point in time.

This method may be practiced in such a manner that an analysis reference time required to be specified for determining the bottleneck in association with a point in time, is set as an arbitrary point in time. Here, the "analysis reference time" may be defined, for example, as one substantially equal to the "given point in time" set forth in this mode (19), or as the "starting time" referred to in a second embodiment of the present invention as described below. The above manner would permit the bottleneck to be detected at any given point in time.

Further, the method according to this mode (19) may be practiced in such a manner that a determination of the bottleneck is iterated over the range of different points in time. This manner would permit monitoring of the shifting of the bottleneck in the system in which the bottleneck changes over time, wherein the shifting is defined as an event in which the bottleneck changes between entities of the system.

(20) The method according to the above mode (19), wherein the bottleneck determining step is implemented to determine an with-maximum-active-time entity which is one of the at least one of the plurality of entities which at least one is situated in the active status at the given point in time, as the bottleneck, wherein the with-maximum-active-time entity has substantially the longest active time among the at least one of the plurality of entities.

The method according to this mode (20) is implemented to determine the bottleneck of a system, behind the findings that it is common that an with-maximum-active-time entity which is one of at least one of the plurality of entities which at least one is situated in the active status at a given point in time, functions as the bottleneck. Wherein, the with-maximum-active-time entity has substantially the longest active time among the at least one the plurality of entities.

In implementing this method, if, for example, the number of the "at least one of the plurality of entities which at least one is situated in the active status at a given point in time" is single, no entity is capable of being compared with the at least one of the plurality of entities, and therefore, the at least one automatically qualifies as the "with-maximum-active-time entity."

To the contrary, if the number of the "at least one of the plurality of entities which at least one is situated in the active status at a given point in time" is plural, plural entities together situated in an active status at a given point in time are compared with each other with respect to the active time, and the "with-maximum-active-time entity" is determined depending on the results from the comparison.

The "with-maximum-active-time entity" in this mode (20) may be interpreted to mean the entity with the truly longest active time, or the entity with an active time in the vicinity of the longest active time, for example.

(21) The method according to the above mode (19) or (20), wherein the bottleneck determining step is implemented to further determine a bottleneck period which is a duration of the at least one bottleneck, on the basis of the collected data.

The method according to this mode (21) would determine the period during which each entity is kept functioning as the bottleneck. Here, the period may be identified with its location on a time base and its length.

According to an arrangement of this method, at least a part of the active period of the with-longest-active-time entity set forth in the previous mode (20) is determined as the bottleneck period. It is not always that the overall of the active period qualifies as the bottleneck period. There can arise a case where the active period of the with-longest-active-time entity overlaps with the active period of another entity, and in this case, during the overlapping period, plural entities are together in an active status, and therefore, it is difficult to identify the bottleneck in the form of a unitary entity.

(22) The method according to any one of the above modes (17) to (21), further comprising a shifting bottleneck determining step of determining, on the basis of an overlap with respect to the active period between ones of the plurality of entities which ones have been determined as a plurality of bottlenecks, at least one of the ones which at least one performs a shifting of the bottleneck, as at least one shifting bottleneck.

There exists a case where ones of the plurality of entities which ones have been determined as bottlenecks overlap with each other with respect to the active period. In this case, during the overlapping period, it is recognized that the bottleneck shifts from the entity which was previously determined as the bottleneck into another entity which was subsequently determined as the bottleneck.

Based on the above findings, the method according to this mode (22) is implemented to determine, on the basis of an overlap between plural entities with respect to the active period, at least one of the plurality of entities which at least one performs a shifting of the bottleneck, as at least one shifting bottleneck.

(23) The method according to the above mode (22), wherein the shifting bottleneck determining step is implemented to determine at least one of the plurality of entities which at least one has an overlap with another entity with respect to the active period, as the at least one shifting bottleneck, for at least a part of a period permitting the overlap of the at least one with the another entity, wherein the at least one entity and the another entity each have been determined as the bottleneck.

(24) The method according to any one of the above modes (17) to (23), wherein the bottleneck determining step is implemented to determine in real time at least one of the plurality of entities which functions as the at least one bottleneck at a current point in time, during operation of the system, the collected data is updated as the operation of the system progresses, whereby the collected data is representative of a manner in which the each entity changes in status with time, during a past period and the current point in time, not during a future period, and the active-time determining step comprises an active-period determining step, operable when the each entity is situated in the active status at the current point in time, of determining on the basis of the collected data a period from a starting point in time at which the active status starts up to the current point in time, as the active period of the each entity.

For an accurate determination as to whether or not each entity of a system functions as the bottleneck of the system during each active period, an accurate determination of an active time representative of the length of the active period to be considered for determining the bottleneck. For this end, the starting time and the termination time of the active period are required to be already known at the time of determining the bottleneck.

In addition, a determination as to whether or not each entity functions as the bottleneck is needed to be made in real time during operation of the system, in some cases. One example is where it is necessary to quickly improve the performance, i.e., the throughput (including the manufacturing capacity), by quickly detecting the entity which functions as the bottleneck during operation of the system, and by taking suitable countermeasures (e.g., resources, such as human, materials, money, etc.) for the entity.

However, during operation of the system, there can be assumed the case where the active period to be considered for determining the bottleneck has not been terminated, leading to an incapability of obtaining the true active time. During operation of the system, a future change in status of each entity could not be obtained without any special idea.

On the other hand, if, where there exists an active period which is not yet terminated at the current time defined as an analysis time, it allow to deem the period from the starting time of the existing active period up to the current time, as an active period, for the sake of convenience, on the basis of data indicative of changes in status of each entity at the current time and at points in time during the past, it becomes possible to detect the bottleneck in real time during operation of the system, although it involves a more or less sacrifice of an accuracy in determining the bottleneck.

In view of the above findings, the method according to this mode (24) is implemented, such that, where each entity is currently in an active status, the period from the starting time of the active status up to the current time is determined as an active period, on the basis of data which represents time-dependent changes in status of each entity at the current time and at points in time during the past, but which fails to represent these changes at points in time during the future, by being sequentially updated as an operation of the system progresses.

Further, this method is implemented, such that at least one of the plurality of entities of the system which at least one functions as the bottleneck at the current time is determined in real time during operation of the system, on the basis of the length of the active period as described above.

Consequently, this method would permit, during operation of the system, a real time detection of the entity currently functioning as the bottleneck, and a real time detection of the shifting in which the bottleneck shifts from an entity to another entity.

Therefore, this method would make it possible to, for example, add available resources into the system in association with the shifting of the bottleneck, thereby improving the performance of the overall system.

(25) The method according to the above mode (24), wherein the bottleneck determining step is implemented, such that, after at least one of the plurality of entities has been determined as the at least one bottleneck, a bottleneck period which is a duration of the at least one bottleneck is not subject to any later correction based on the data collected after determination of the at least one bottleneck.

For fulfilling the need to determine in real time the bottleneck of a system with the method according to the above mode (24), once an entity of the system has been determined as functioning the bottleneck during a given period, irrespective of whether or not the determination has been made by ignoring the future during which changes in status of the entity is unknown at the current time, it is not allowed to later correct the content of the determination after termination thereof.

In light of the above findings, the method according to this mode (25) is implemented, such that, after at least one of the plurality of entities has been determined as the at least one bottleneck, the bottleneck period which is the duration of the at least one bottleneck is not subject to any later correction based on the data collected after determination of the at least one bottleneck.

It is noted that the method according to the above mode (24) may be practiced, such that, after at least one of the plurality of entities has been determined as the at least one bottleneck, the bottleneck period which is the duration of the at least one bottleneck is corrected, on the basis of data representative of the behavior of the system as collected after determination of the at least one bottleneck.

(26) The method according to the above mode (24) or (25), wherein the bottleneck determining step comprises a step of determining, after an duration of at least one of the plurality of entities which has been determined as the at least one bottleneck has been determined as a precedent bottleneck period, the active period of each one of at least one of the plurality of entities exclusive of a precedent bottleneck having the precedent bottleneck, which the at least one is in the active status at a reference time after-termination which is after a time at which the precedent bottleneck period is terminated, wherein the active period has an overlap with the precedent bottleneck period, as a subsequent bottleneck period exclusive of the overlap.

There exists a case where the precedent bottleneck period for the precedent bottleneck overlaps with the active period for the subsequent bottleneck having the subsequent bottleneck period. In this case, under an environment where the bottleneck is scheduled to be determined in real time, the precedent bottleneck is previously determined as functioning the bottleneck during the overlap of the active period for the subsequent bottleneck with the precedent bottleneck period, and any correction to the previous determination may not be allowed. Consequently, in this case, the overlap of the active period for the subsequent bottleneck with the precedent bottleneck period is incapable of being treated as a part of the subsequent bottleneck period.

Based on the above findings, the method according to this mode (26) is implemented, such that the active period for the at least one entity which is in an active status at the reference time after-termination which is after the time at which the precedent bottleneck period is terminated, wherein the active period has an overlap with the precedent bottleneck period, is determined as a subsequent bottleneck period exclusive of the overlap.

(27) The method according to the above mode (26), wherein the bottleneck determining step further comprises a step of determining, immediately after determination of the precedent bottleneck period, that a shifting in which the bottleneck instantaneously shifts from one of the plurality of entities having the determined precedent bottleneck period to another entity having the determined subsequent bottleneck period.

(28) The method according to any one of the above modes (17) to (23), wherein the bottleneck determining step is implemented to determine at least one of the plurality of entities which functions as the least one bottleneck at a given point in time, for an actual past operation, or an analyzed past operation by simulation, of the system, the collected data is representative of a manner in which the each entity changes in status with time, not only during a past period before the given point in time, but also during a future period after the given point in time, and the active-time determining step comprises an active-period determining step of determining, on the basis of the collected data, a period from a starting time at which the active status starts up to a termination time at which the active status is terminated, as the active period for the each entity.

There exists a case where a determination of an entity functioning as the bottleneck at a give point in time is needed for an actual past operation, or a virtual past operation analyzed by simulation, of the system. In this case, data which is collected until the given point in time is representative of a manner in which each entity changes in status with time, not only during the past period before the given point in time, but also during the future period after the given point in time.

Accordingly, the method according to this mode (28) is implemented, such that the period from the starting time of an active status up to the termination time of the same active status is determined, per entity, as its active period, on the basis of the collected data, for thereby determining the bottleneck for the actual past operation, or the analyzed past operation by simulation, of the system.

Consequently, this method would permit an active period that is to be considered for determining the bottleneck, to be obtained as the true active period, resulting in an improved accuracy in determining the bottleneck.

(29) The method according to any one of the above modes (17) to (23), wherein the bottleneck determining step is implemented to determine at least one of the plurality of entities which functions as the at least one bottleneck at a current point in time, during operation of the system, the collected data is sequentially updated as the operation of the system progresses, thereby representing a manner in which the each entity changes in status with time, during a past period and the current point in time, not during a future period, the active-time determining step comprises an active-period predicting step of predicting by simulation the active time for at least one of the plurality of entities which is situated in the active status at the current point in time, on the basis of the collected data, and the bottleneck determining step is implemented to determine the at least one bottleneck, on the basis of the collected data and the predicted active time.

Where data indicative of the status of each entity is obtained during operation of the system, the data represents the behavior of the system during the past and the current point in time, but not during the future. However, it is possible to predict by simulation the future behavior of the system, from the past and current behavior of the system. One example of the reasons is that it is possible to formulate a specified causal relation between the past and current behavior and the future behavior, of the system.

The prediction of the future behavior of the system from the past and current behavior of the system would make it possible to estimate the active time at a certain adequate accuracy, in an attempt to determine the bottleneck during operation of the system, even where the active period has not yet terminated, which is to be considered for determining the bottleneck. It is recognized that the thus estimated active time reflects the true active time more accurately than the active time determined as a result of completely ignoring the future behavior of the system.

Based on the above findings, the method according to this mode (29) is implemented to determine the bottleneck, in operation of the system, while predicting the future behavior of the system.

(30) The method according to the above mode (28) or (29), wherein the bottleneck determining step is implemented to determine at least one of the plurality of entities as the at least one bottleneck, thereby determining at a determination time a duration of the at least one bottleneck as a bottleneck period, and to subsequently correct the determined bottleneck period, on the basis of data representative of a behavior of the system shown after the determination time.

Where it is necessary to determine the entity functioning as the bottleneck at a give point in time, for the actual past behavior, or the analyzed past behavior by simulation, of the system, later correction to the previous determination of the bottleneck is permitted. In addition, even where it is necessary to detect the bottleneck in real time in operation of the system, later correction to the previous determination of the bottleneck is possibly permitted.

In light of the above findings, the method according to this mode (30) is implemented, such that, after the bottleneck period is determined for an entity, the determined bottleneck period is corrected on the basis of data representative of the operational behavior of the system shown after the previous determination of the bottleneck period.

Consequently, this method would readily improve the accuracy of the resulting determination of the bottleneck.

(31) The method according to any one of the above modes (28) to (30), wherein the bottleneck determining step comprises a first step of determining at least one of the plurality of entities as the at least one bottleneck, thereby determining an duration of the at least one bottleneck as a precedent bottleneck period; and of subsequently the active period of at least one of the plurality of entities exclusive of a precedent bottleneck having the precedent bottleneck period, which at least one is in the active status at a reference time after-termination which is a time after the precedent bottleneck period is terminated, as a subsequent bottleneck period resulting from a beforehand or afterward exclusion of at least one portion of an overlap of the active period with the precedent bottleneck period, from the active period.

There exists a case where the active period of the at least one entity which is in an active status at the time after the precedent bottleneck period of another entity, i.e., the precedent bottleneck is terminated. In this case, it is normally unreasonable to consider that the at least one entity functions as the bottleneck over the overlap of the active period of the at least one entity with the precedent bottleneck period.

In view of the above findings, the method according to this mode (31) is implemented to determine the active period for at least one entity other than the precedent bottleneck, which at least one is in an active status at the reference time after-termination which is the time after the precedent bottleneck period is terminated, wherein the active period has an overlap with the precedent bottleneck period, as a subsequent bottleneck period resulting from a beforehand or afterward exclusion of at least one portion of the overlap, from the active period.

In this mode (31), the phrase "beforehand exclusion of at least one portion" means that the determined bottleneck period does not include the at least one portion, at the beginning, while the phrase "afterward exclusion of at least one portion" means that, although the determined bottleneck period originally had the at least one portion, the determined bottleneck period is thereafter corrected so as not to include the at least one portion.

(32) The method according to the above mode (31), wherein the bottleneck determining steps further comprises a second step of determining, after termination of implementation of the first step, that there is performed between the precedent and the subsequent bottleneck period a shifting in which the bottleneck shifts from an entity which has the precedent bottleneck period to another entity which has the subsequent bottleneck period.

The method according to this mode (32) would make it possible to detect a shifting in which the bottleneck shifts from an entity to another entity.

(33) The method according to the above mode (32), wherein the second step comprises a step of determining as a shifting period during the shifting is continuously performed, an overlap of the active period of one of the plurality of entities which has the subsequent bottleneck period, with the active period of one of the plurality of entities which has the precedent bottleneck period.

The method according to this mode (33) would define the shifting of bottleneck as a continuous event.

(34) The method according to the above mode (32) or (33), wherein the second step comprises a step of determining as a shifting period during the shifting is continuously performed, an overlap of the active period of one of the plurality of entities which has the precedent bottleneck period, with the active period of one of the plurality of entities which has the subsequent bottleneck period.

The method according to this mode (34) would define the shifting of bottleneck as a continuous event.

(35) The method according to the above mode (32), wherein the second step comprises a step of determining as a shifting point in time at which the shifting is instantaneously performed, a point in time within an overlap of the active period of one of the plurality of entities which has the subsequent bottleneck period, with the active period of one of the plurality of entities which has the precedent bottleneck period.

The method according to this mode (35) would define the shifting of bottleneck as an instantaneous event.

(36) The method according to the above mode (32) or (35), wherein the second step comprises a step of determining as a shifting point in time at which the shifting is instantaneously performed, a point in time within an overlap of the active period of one of the plurality of entities which has the precedent bottleneck period, with the active period of one of the plurality of entities which has the subsequent bottleneck period.

The method according to this mode (36) would define the shifting of bottleneck as an instantaneous event.

(37) The method according to the above mode (32), wherein the second step comprises a step of determining as a gradual shifting period during which the shifting is gradually performed, a point in time within an overlap of the active period of one of the plurality of entities which has the subsequent bottleneck period, with the active period of one of the plurality of entities which has the precedent bottleneck period.

The method according to this mode (37) would define the shifting of bottleneck as a gradual event.

(38) The method according to the above mode (32) or (37), wherein the second step comprises a step of determining as a gradual shifting period during which the shifting is gradually performed, a point in time within an overlap of the active period of one of the plurality of entities which has the precedent bottleneck period, with the active period of one of the plurality of entities which has the subsequent bottleneck period.

The method according to this mode (38) would define the shifting of bottleneck as a gradual event.

(39) The method according to any one of the above modes (17) to (38), wherein the bottleneck determining step is implemented to determine, on the basis of the collected data, at least one of the plurality of entities which functions as the at least one bottleneck; and a bottleneck period which is a duration of the at least one bottleneck, and the method further comprising:

a bottleneck-period-representative-value calculating step of calculating, after some bottleneck periods have been determined in the bottleneck determining step for the each entity, a representative value which represents time lengths of some of the determined some bottleneck periods which some belong to a designated analysis period, for the each entity; and a representative-bottleneck determining step of determining, on the basis of a relationship in magnitude between some representative values calculated in the bottleneck-period-representative-value calculating step, a representative bottleneck of the plurality of entities during the designated analysis period.

The method according this mode (39) would make it possible to globally detect the representative bottleneck representing the plurality of entities, from the perspective of whether or not it functions as the bottleneck during a designated analysis period, other than to locally detect the representative bottleneck at a given point in time.

The unit of the physical quantity of the "representative value" in this mode (39) may be defined as an active time, or a percentage active time obtained by dividing an active time by the length of the aforementioned designated analysis period.

(40) The method according to the above mode (39), wherein the representative bottleneck determining step comprises a step of determining as the representative bottleneck one of the plurality of entities having the representative value calculated in the bottleneck-period-representative-value calculating step as substantially the largest among the plurality of entities.

The method according to this mode (40) would make it possible to detect as the representative bottleneck, the entity substantially the most greatly bearing the characteristics of the bottleneck throughout the designated analysis period.

(41) The method according to any one of the above modes (17) to (40), further comprising:

a shifting bottleneck determining step of determining at least one of the plurality of entities which functions as at least one shifting bottleneck, on the basis of an overlap of the active periods of some of the plurality of entities which some have been determined as the at least one bottleneck; and of further determining a shifting period which is a duration of the determined at least one shifting bottleneck;

a shifting-period-representative-value calculating step, implemented after some shifting periods have been determined in the shifting bottleneck determining step for the each entity, of calculating, for the each entity, a representative value representing some of the determined some shifting periods which some belong to a designated analysis period; and a representative-shifting-bottleneck determining step of determining a representative shifting bottleneck representing the plurality of entities during the designated analysis period, on the basis of a relationship in magnitude between some representative values which have been calculated for the each entity in the shifting-period-representative-value calculating step.

The method according to this mode (41) would make it possible to globally detect the representative shifting bottleneck representing the plurality of entities, from the perspective of whether or not it functions as the shifting bottleneck during a designated analysis period, other than to locally detect the representative shifting bottleneck at a given point in time.

(42) The method according to the above mode (41), wherein the representative shifting bottleneck determining step comprises a step of determining as the representative shifting bottleneck one of the plurality of entities having the representative value calculated in the shifting-bottleneck-period-representative-value calculating step as substantially the largest among the plurality of entities.

The method according to this mode (42) would make it possible to detect as the representative shifting bottleneck, the entity bearing the largest characteristics of the shifting bottleneck throughout the designated analysis period.

(43) The method according to any one of the above modes (1) to (42), wherein the system is constructed, such that a flow of processing is realized with the plurality of entities, whereby the performance of the system is collectively achieved.

One example of the "system" in this mode (43) is a manufacturing system, another example is a computer network, and still another example is an electric circuitry constituting a computer.

(44) A computer program to be executed by a computer to implement the method according to any one of the above modes (1) to (43).

When the computer program according to this mode (44) is executed by a computer, the same advantageous effects would be provided, according to basically the same principle as one accepted in the method set forth in any one of the above modes (1) to (43).

The term "program" may be interpreted to include, not only a set of instructions to be executed by a computer so that the program may function, but also any files and data to be processed by the computer according to the set of instructions.

(45) A computer-readable storage medium having stored therein the computer program according to the above mode (44).

When there is executed by a computer the program having been stored in the computer-readable storage medium according to this mode (45), the same advantageous effects would be provided, according to basically the same principle as one accepted in the method set forth in any one of the above modes (1) to (43).

The term "storage medium" may be realized in different types, including a magnetic recording medium such as a floppy-disc, an optical recording medium such as a CD and a CD-ROM, an optical-magnetic recording medium such as an MO, an unremovable storage such as a ROM, for example.

(46) A system for implementing with a computer the method according to any one of the above modes (1) to (43).

The system according to this mode (46) would provide the same advantageous effects would be provided, according to basically the same principle as one accepted in the method set forth in any one of the above modes (1) to (43).

BRIEF DESCRIPTION OF THE SEVERAL VIEWS OF THE DRAWINGS

The foregoing disclosure of the invention, as well as the following detailed description of best mode for carrying out the invention, will be better understood when read in conjunction with the appended drawings. For the purpose of illustrating the invention, presently preferred embodiments are shown in the drawings. It should be understood, however, that the invention is not limited to the precise arrangements and instrumentalities shown. In the drawings:

FIG. 2 shows a list of data required for detecting the bottleneck of the system by implementing the above example of application;

FIG. 5 lists formulas for explaining the system-entity-effect-level determination program indicated in FIG. 4;

FIG. 6 shows a list of data for explaining one illustrative example of execution results from execution of the system-entity-effect-level determination program indicated in FIG. 4;

DETAILED DESCRIPTION OF THE INVENTION

Figure 1:
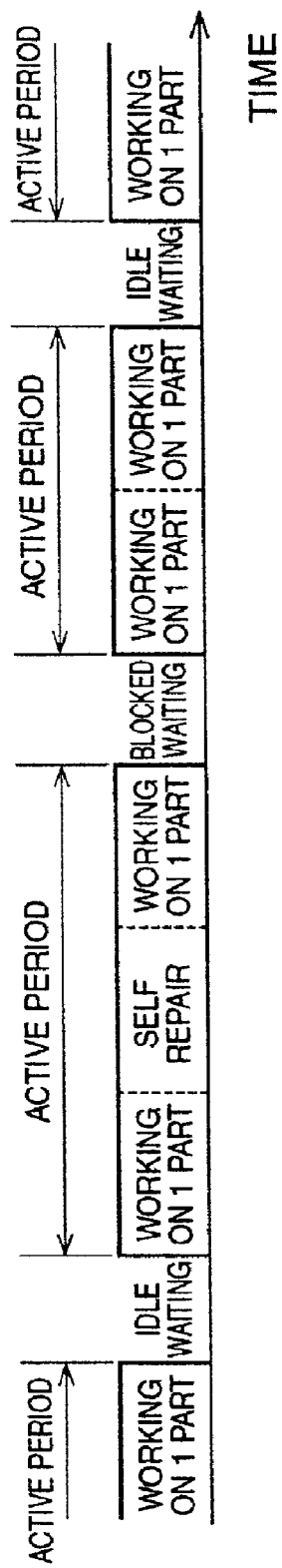
FIG. 1 is a time chart illustrative of how an entity changes in status with time, wherein the entity is one component of a system in which there is implemented an example application of a system-entity-effect-level determining method constructed according to a first embodiment of the present invention, wherein the shown entity is a production machine.

Several presently preferred embodiments of the invention will be described in detail by reference to the drawings in which like numerals are used to indicate like elements throughout.

A first embodiment of the present invention provides a system-entity-effect-level determining method (hereinafter, abbreviated as "effect-level determining method") of determining the level of the effect of each one of a plurality of entities constituting a discrete event system, on the performance of the system. With the effect-level determining method, there are determined one or more entities of the plurality of entities, which each constitute the bottleneck with respect to the performance of the system.

The above discrete event system is constituted with a plurality of entities performing different actions. The discrete event system contains zero or more objects, which do not perform actions. Those entities may perform actions on objects, for example by processing (or modifying) or transporting objects. Those entities may also perform actions on other entities.

An example of the above discrete event system is a manufacturing line. In the manufacturing line, objects are parts manipulated, i.e., either combined, modified or separated. In the manufacturing line, entities are machines performing the manipulations.

However, those entities are not only ones modifying the objects. There may also be entities for transporting the objects like automated guided vehicles or human workers. Some entities may perform services on other entities, as for example a repair team repairing machines if necessary. As stated above, other entities may be used to enter objects into the system or to remove objects out of the system. Finally, some entities may be used for a combination of any of the above purposes.

While the entities described above are most frequent, other entities not described here may also be included in application of the present invention.

Normally, all of these entities are limited by the number of actions that they can perform in a give period of time. Subsequently, the overall system is limited by the number of parts that can pass through the system in a give period of time.

Some entities have a greater effect on the overall system performance than other entities. This embodiment measures the effects of different entities on the total system performance. In most cases, some entities limit the overall system throughput more greatly than other entities. These entities are commonly called bottlenecks or constraints.

This embodiment calculates the effects of the limited entities on the limits of the system performance, and determines one or more bottlenecks.

In order for this embodiment to determine the bottleneck, the system has to be observed in action. The observation may be for example by watching the aforementioned manufacturing line or by collecting simulation data. The information required is a list of data for each entity, detailing the status of the entity at any given point in time.

Referring first to FIG. 1, there is shown an example of the status of a machine (e.g., a processing machine) throughout time. The machine is working on parts at some times, idle and waiting for new parts at other times, blocked due to a full output queue and waiting for the completion of output of parts, and broken down and under repair at other times. Here, the blocked status of the machine means that, for example, because the subsequent unit, such as a buffer, another machine, a conveyor belt, etc. is already full or busy and cannot take any part, the machine cannot remove a completed part.

Referring next to FIG. 2, there is shown a set of example data for different machines. In this example, the machine name and the time are given for each change in the status of each machine. In FIG. 2, status "0" indicates that each entity is working, status "1" indicates that each entity is idle and waiting for new parts, status "2" indicates that each entity is blocked and waiting for the completion of output, and status "3" indicates that each entity is broken down and under self repair. The list of data shown in FIG. 2 is required in order to implement this embodiment.

The above data, having been obtained from the system during a steady state period thereof, preferably contains no data changing with time during the transitional state period during which the system is under an initial working condition.

In addition, the above data may be considered as one obtained where the system is of a steady state type (this term is used to mean that the system at least bears a steady state), and may be also considered as one obtained where the system is of a non steady state type (this term is used to mean that the system at least bears a non steady state).

However, the system in which this embodiment is to be implemented is of the steady state type. A steady state system is categorized into a full steady state system in which an entity functioning as the bottleneck is independent of time, irrespective of whether or not a disturbance is applied into the system; and a semi steady state system which is in a steady state independent of time, as long as no disturbance is applied into the system, but shifts into a non steady state dependent on time, upon application of a disturbance into the system.

Figure 3:
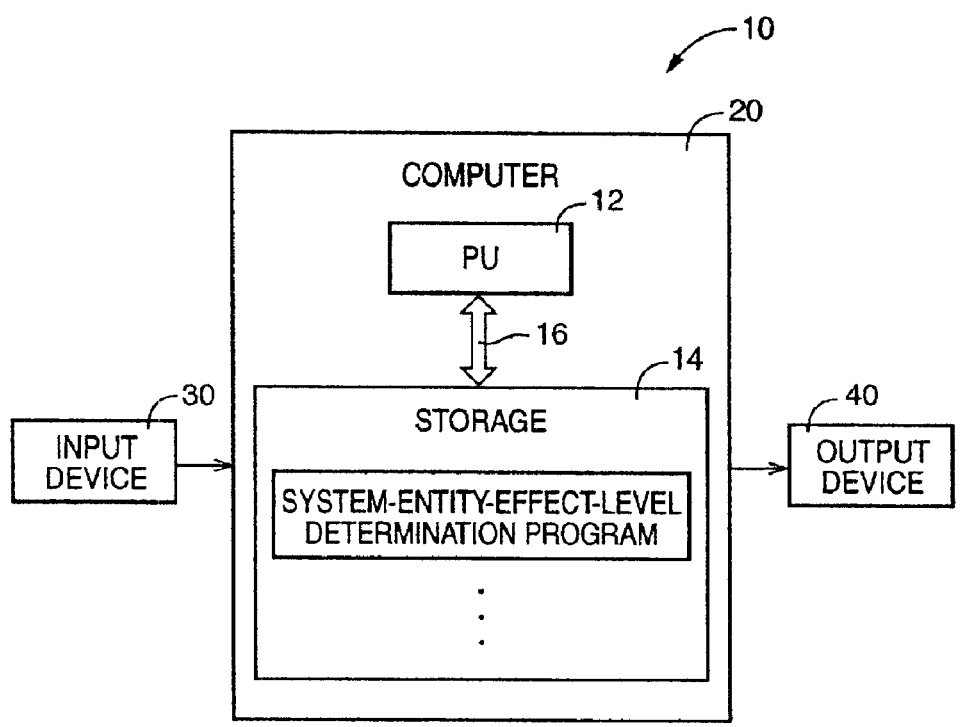
FIG. 3 is a block diagram illustrating the hardware structure of a computer system used by a user for implementing the above system-entity-effect-level determining method constructed according to the first embodiment of the present invention.

Referring next to FIG. 3, there is shown with a block diagram the hardware structure of a computer system 10 used by a user in order to implement the above effect-level determining method. This computer system 10 is one example of a system-entity-effect-level determining apparatus.

The above computer system 10 contains, as well known in the art, a computer 20 configured by connecting a processing unit (hereinafter and in FIG. 3, indicated by "PU") 12 and a storage 14 each other via a bus 16.

The computer 20 is connected with an input device 30 including a mouse functioning as a pointing device and a keyboard; an output device 40 for displaying an image on its screen. The above storage 14 is constructed to include a recording medium, such as a ROM, a RAM, a magnetic disc, an optical disk, etc.

The user enters into the computer 20 via the input device 30 data required. In response to the entry, results from data processing by the computer 20 is visualized and presented to the user via the output device 40.

The aforementioned storage 14 has previously stored a system-entity-effect-level determination program (hereinafter, referred to simply as "effect-level determination program") to be executed by the above PU 12 for implementation of the above effect-level determining method. The storage 14 is intended to be used, such that data used for the PU 12 to execute the effect-level determination program methods is stored therein if necessary.

Figure 4:
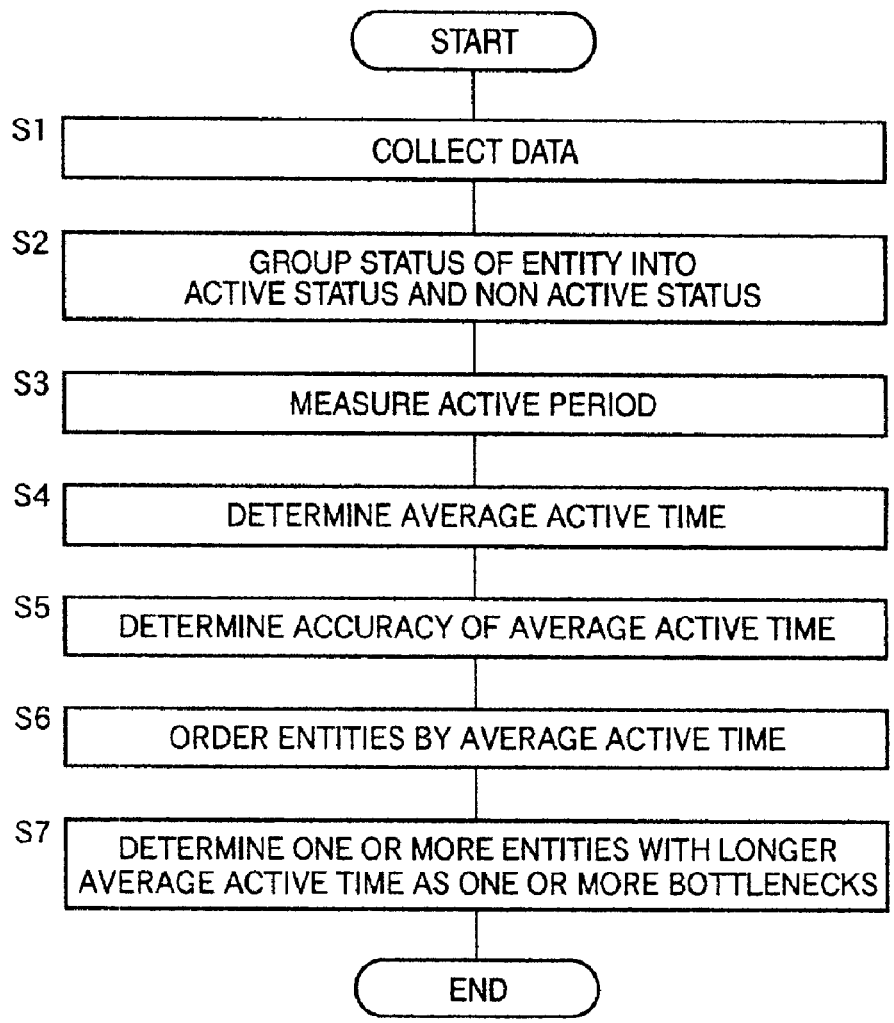
FIG. 4 is a flow chart schematically illustrating a system-entity-effect-level determination program indicated in FIG. 3.

Referring next to FIG. 4, there is schematically illustrated with a flow chart the above effect-level determination program. While this program will be described below in reference to the flow chart, the definitions of several symbols used in this program will be first explained.

X: active time as a variable, as constructed with a set of individual data values $x_i$ $x_i$: each one of the individual data values belonging to active time X i: numeral order of each individual data value $x_i$ n: set size, namely, the number of individual data values $x_i$ in the set thereof a: confidence level $z_{N-1,(1-a)/2}$: chi-square distribution (1-a)/2 quantile for set size n E[X]: mean of active time X S[X]: standard deviation of active time X CI[X]: confidence interval half width of active time X The above effect-level determination program is initiated with step S1 to collect data regarding the status of each entity at any given point in time.

The data about the present system may be in a form similar as shown in FIG. 2. Specifically, the data is constructed, such that, for example, the identifier (e.g., "M1", "M2", "M3", etc.) of each entity or machine; the status (e.g., "0", "1", "2", "3", etc., as mentioned before) of each machine; and regarding-time information for specifying each period during which each machine shows each status. The regarding-time information is constructed to include, as described below, the starting time and the termination time, of each period during which each machine shows each status.

It is noted to make sure, that, while the table illustrated in FIG. 2 indicates the active times as described below, corresponding to the above regarding-time information, this does not mean that the aforementioned data originally includes the active times. These active times are later obtained by calculation from the above starting and termination times.

Further, the above data may be historical data indicative of the actual behavior of the system, or analytical data indicative of the virtual behavior of the system, which is obtained by simulation.

Step S1 is followed by step S2 in which the different statuses for each entity are investigated. Particularly, each status of each entity is classified as one of two groups, on the basis of the collected data as explained previously. The first group contains all the statuses where each entity is active, i.e., in an active status. The second group contains all the statuses where each entity is inactive, i.e., in a non active status.

For example, a manufacturing machine may be considered active if it is:

(a) Working on an object;
(b) Changing tools automatically or semi-automatically;
(c) Performing self service as for example cleaning operations or reloading of data;
(d) Performing self repair; or
(e) Loading or unloading an object using integrated loading mechanisms.

The above manufacturing machine may be considered inactive if it is, for example:

(a) Idle and waiting for delivery of a new part;
(b) Blocked and waiting for removal of a part; or
(c) Malfunctioning and waiting for a repair entity to start repairing the manufacturing machine.

Transport entities in the above manufacturing machine may be considered active if they each are:

(a) Transporting an object to an entity; or
(b) Moving to an entity to pick up a part.

The transport entities may be considered inactive if they are waiting for a new transport request.

Entities for adding and removing objects in and out of the present system may be considered active if they are retrieving an object into the system or removing an object out of the system.

It is noted that not only the instance of the adding or removal has to be considered but also the whole time for which a transport entity is busy until the next object can be added or removed. The transport entity is considered inactive if it would be able to deliver a new object but cannot deliver due to lack of storage/processing capacity in the system, or if the entity would be able to remove an object from the system but cannot remove due to lack of objects to be removed.

In summary, the different statuses observed in each entity are investigated, and it is decided if the status is considered active and therefore limiting the throughput of the system, or if the status is considered inactive and does not affect the throughput of the system.

Step S2 is followed by step S3 in which the aforementioned active times, i.e., the durations of an entity being active are measured, on the basis of the collected data as previously referred to, for all the machines, i.e., all the entities.

As described before, FIG. 1 shows an example of one machine, which is considered active if it is either working on a part or performing repair, and is considered in active if it is waiting for the adding or removing of parts.

The active time, i.e., the duration of an active period is the time difference between the end of the last inactive status till the beginning of the next inactive status. In step S3, the durations of the active periods for each entity are measured and stored.

Formula (1) indicated in FIG. 5 shows an example of the stored active durations for one entity, where an entity has n active periods with respect to active time X.

It is noted that it is not always adequate to define the above "repair" as an action falling within the active status of each entity.

Where, for example, an entity has to wait for a long time until the repair service for the entity, this is an interruption of the essential action of the entity, and it is therefore adequate to classify the repair as an inactive status of the entity.

By contrast, where the repair service for the entity would be finished in a short time after the repair service starts instantly since termination of working of the entity, the repair service fails to interrupt the essential action of the entity, and it is therefore adequate to classify the repair as an active status of the entity.

Step S3 is followed by step S4 in which the average duration of the active period is determined for all the machines, i.e., all the entities. Formula (2) indicated in FIG. 5 shows the calculation of the arithmetic mean of a set of data collected in step S3 and shown by formula (1) in FIG. 5.

However, it is possible to use as the average of the duration of the active period, other measures of average, such as a geometric mean, a harmonic mean, a median, etc. It is also possible to calculate various averages for trimmed data.

The longer the duration of the active period for an entity, the greater effect the entity has in limiting the overall system performance. The entity with the longest average active time is most likely to be the bottleneck.

Following step S4, step S5 is optionally implemented depending upon the user's request. In step S5, the accuracy of the average active time determined in step S4 is determined. The objective of step S5 is to determine if the average active time of one entity differs from that of another entity. The determination depends on the effect of random variation towards the average active time.

One popular approach of measuring the accuracy of an average is the calculation of a confidence interval. A confidence interval describes a range within which the unknown true value may be.

If the data as expressed by formula (1) indicated in FIG. 5 is independent and identically distributed, it is possible to calculate a measure of variation, as for example the unbiased estimator of the standard deviation S expressed by formula (3) indicated in FIG. 5.

The above unbiased estimator of the standard deviation S would allow the calculation of a measurement of the accuracy of the data, as for example a confidence interval CI (precisely, the aforementioned confidence interval half width) based on the chi-squared distribution expressed by formula (4) indicated in FIG. 5. Other calculation approaches are also possible.

Step S5 is followed by step S6 in which the entities are ordered according to the determined average active time. The entity with the longest average active time is most likely the entity having the largest impact on the system performance, i.e., being the bottleneck.

However, due to random fluctuations it is advisable to check if the longest average active time is indeed different from all other average active times, as in step S5. If it cannot be said with reasonable accuracy that the average active times are different, then other entities also may be the bottlenecks. In this case, it is either necessary to consider more than one bottleneck or to collect more data to achieve higher accuracy. In any case, step S6 would determine the bottleneck(s) of the system.

Then, one cycle of execution of this effect-level determination program is terminated.

Subsequently, an improvement of the entity determined as the bottleneck as described above would bring an improvement of the overall system performance.

It is here noted that, while an average active time is calculated in the present embodiment, it does not mean to bind the scope of the present invention. The present invention also achieves its object by comparing the individual active times, for example comparing the active times of different active entities within a given time.

There will be next specifically described this embodiment in reference to an example of a practical application of this embodiment.

The application example is directed to a manufacturing system with seven machines. The system produces different parts. The machines have different average cycle times for the different parts. All the machines are at any given time either working, idle or blocked. FIG. 6 shows the results from simulation performed during a given period. In particular, the results have the average percentage working time (in FIG. 6, referred to simply as "percentage working time"), and the average active time (in FIG. 6, referred to simply as "active time"). A confidence interval half width (in FIG. 6, referred to as "95% CI") has been constructed on these values with a confidence level of 95%.

Figure 7:
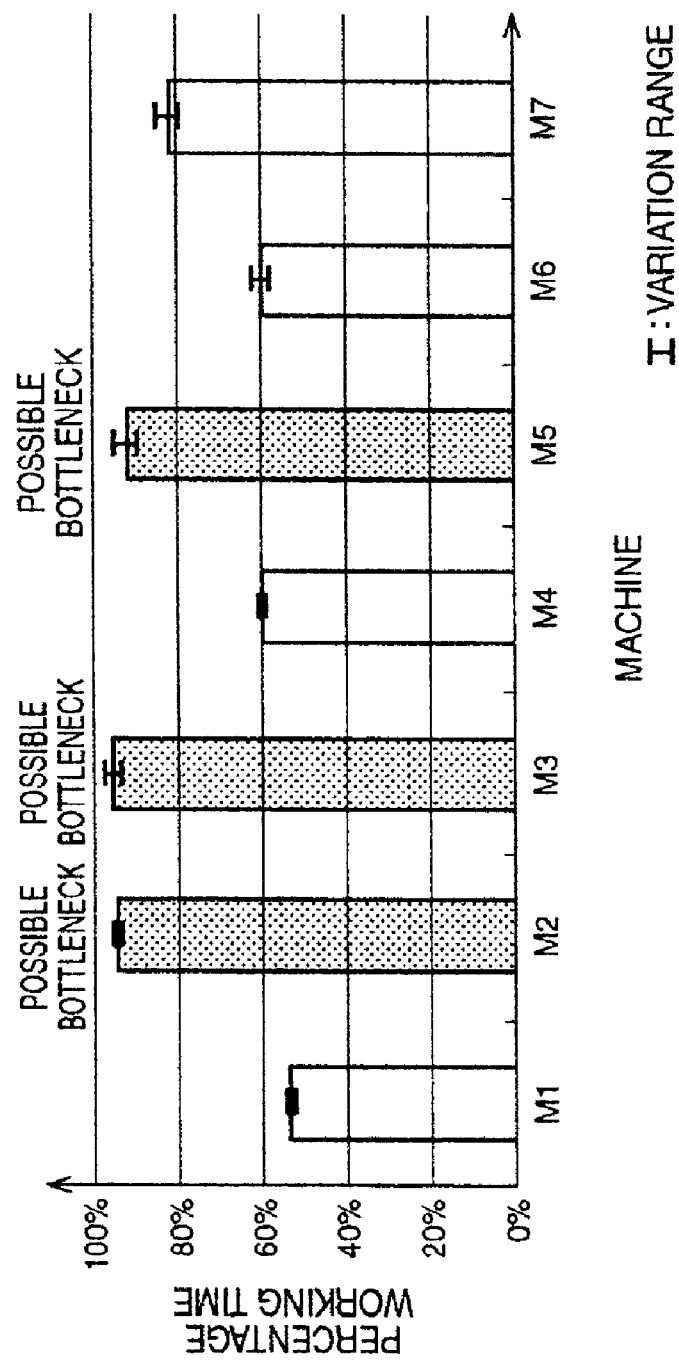
FIG. 7 is a graph illustrating the above execution results.

While machine M3 has the highest percentage working time with 95.1%, it cannot be said for sure that machine M3 is the bottleneck. The reason is that, as shown with a graph in FIG. 7, the variation range (calculated by considering the confidence interval of the percentage working time) of the percentage working time for machine M3 overlaps with the variation ranges of the percentage working times for machines M2 and M5. Therefore, it cannot be said which one of the three percentage working times is the longest under the given confidence level, meaning that either one of the three machines M2, M3 or M5 may be the bottleneck.

Figure 8:
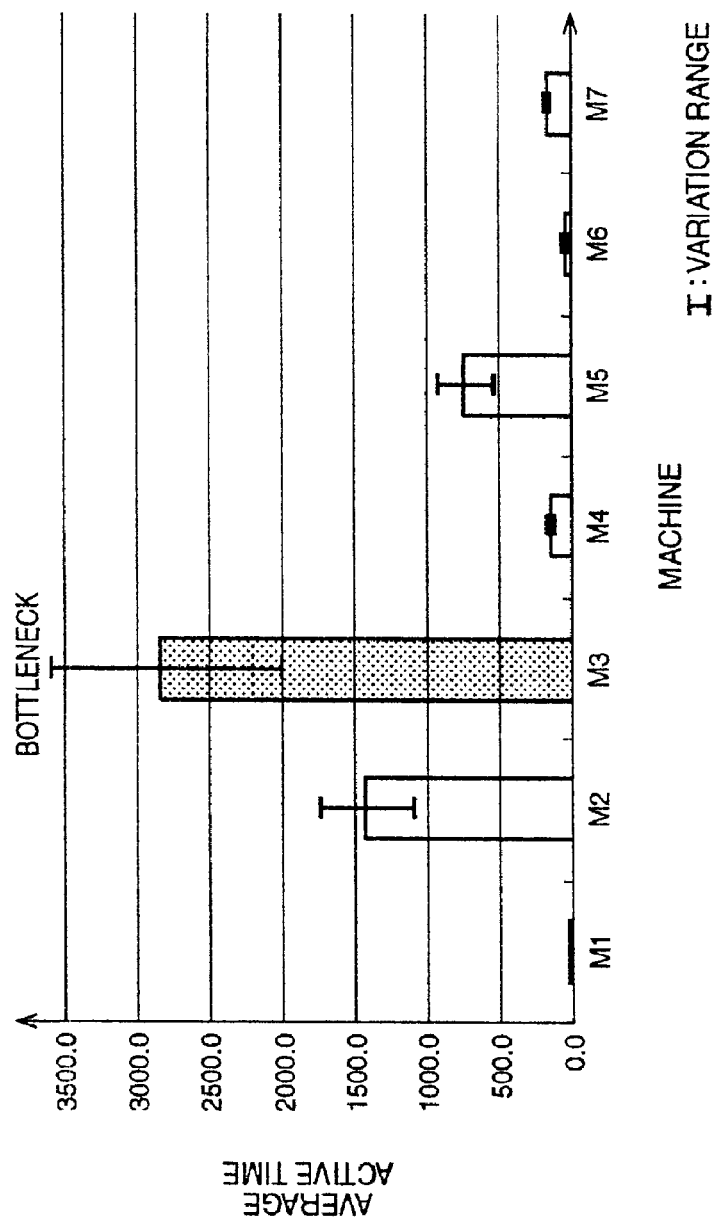
FIG. 8 is another graph illustrating the above execution results.

However, investigating the average active time for the same simulation makes the results more clear. The average active time is also shown in FIG. 6, indicating the 95% confidence interval CI of the average active time. In this case, it can be said with statistical accuracy that the average active time of machine M3 is longer than all other average active times of the simulated machines. This is visualized with a graph in FIG. 8.

Consequently, this embodiment, avoiding the comparisons between entities constituting of a system from being easily affected by random variation of data, would make it possible to detect a bottleneck faster and with higher accuracy than the aforementioned conventional methods, even if the amount of data available is small.

Further, this embodiment would allow detection of a bottleneck with less data for a required accuracy. For example, this embodiment would facilitate detection of a bottleneck using data sets too small to detect a bottleneck with the aforementioned conventional methods.

Still further, this embodiment would allow a faster detection of a bottleneck, as stated above, thereby contributing to a faster improvement of the system. This faster improvement would reduce the waste of the system and improve the overall system efficiency.

Additionally, this embodiment would, due to the above faster bottleneck detection, allow detection of bottlenecks for non steady state or semi steady state systems. While this embodiment would allow, in a steady state system, by using the average active time for each entity of the system, detection of an entity qualifying as the bottleneck, this embodiment would allow, in a system in which due to non stable behavior thereof the bottleneck changes between entities over time, detection of a bottleneck at an given point in time.

Further, while this embodiment is implemented, such that bottlenecks can be detected in processing entities of the system, the present invention may be practiced, such that bottlenecks can be detected in non-processing entities of the system, as for example, transport entities, service entities, or supply and demand entities.

Still further, this embodiment may be easily implemented in a software program, using data easily obtainable and often already available. This implementation requires no complex information about the system structure.

Yet further, this embodiment would permit the accuracy of the bottlenecks to be easily obtained, resulting in a capability of estimating the influence of random variation on the bottleneck detection.

Additionally, this embodiment would facilitate detection of multiple bottlenecks.

Further, while this embodiment is implemented, in a steady state system, to calculate a plurality of average active times for each entity, and to compare the entities with respect to the average active time, thereby determining the bottleneck of the system, the present invention may be practiced in a manner to detect at least one of the entities functioning as at least one bottleneck in a non steady state system the behavior of which changes over time.

With this manner, the entity with the longest active time is determined as the bottleneck at a given point in time, for example.

Still further, while the above-described example of application of this embodiment permits determination of at least one of entities of the manufacturing system, as qualifying as at least one bottleneck, the present invention may be practiced for determining at least one of entities of other systems, such as a computer or a computer network, as qualifying as at least one bottleneck.

As will be evident from the above explanation, this embodiment could provide the following advantages optionally or altogether:

(a) This embodiment allows detection of a system bottleneck requiring smaller amount of data than the aforementioned conventional methods, for the same accuracy;

(b) This embodiment allows detection of a system bottleneck with a higher accuracy for the same amount of data compared to the conventional methods;

(c) This embodiment allows detection of a system bottleneck for a small amount of data, such as where the conventional methods cannot detect the system bottleneck;

(d) This embodiment allows, due to its faster bottleneck detection, an earlier improvement of the bottleneck throughput, and subsequently an earlier improvement of the system to maximize its efficiency;

(e) This embodiment allows an easy implementation of the bottleneck detection with automated analysis software (i.e., a computer program);

(f) This embodiment allows detection of the system bottleneck using standard system data which is easy to measure and frequently already available as part of standard system monitoring activities;

(g) This embodiment does not require information about the structure of the system, i.e., how the processing entities connect to each other;

(h) This embodiment would allow detection of a bottleneck change in a non steady state system;

(i) This embodiment would allow detection of detect supply bottlenecks, where the system throughput is constrained by the rate of parts input into the system;

(j) This embodiment would allow detection of transport bottlenecks, where the system throughput is constrained by transport entities transporting objects to other entities;

(k) This embodiment would allow detection of service and maintenance bottlenecks, where the system throughput is constrained by service and maintenance entities servicing and maintaining other entities;

(l) This embodiment would allow detection of bottlenecks not only in processing entities but also all other system entities;

(m) This embodiment would allow determination of the accuracy of the bottleneck detection;

(n) This embodiment would allow detection of multiple bottlenecks; and (o) This embodiment would allow determination of the relative importance of multiple bottlenecks.

As will be readily understood from the above description, in this embodiment, step S1 indicated in FIG. 4 constitutes one example of the "collecting step" set forth in the above mode (1), step S2 constitutes one example of the "classifying step" set forth in the same mode, step S3 constitutes one example of the "active-time determining step" set forth in the same mode, and steps S4 to S7 together constitute one example of the "effect-level determining step" set forth in the same mode.

Further, in this embodiment, steps S4 to S7 indicated in FIG. 4 together constitute one example of the "effect-level determining step" set forth in the above mode (2).

Still further, in this embodiment, step S4 indicated in FIG. 4 constitutes one example of the "bottleneck determining step" set forth in the above mode (8).

Yet further, in this embodiment, the steady state system constitutes one example of the "system" set forth in the above mode (11) or (12), and step S7 indicated in FIG. 4 constitutes one example of the "bottleneck determining step" set forth in the above mode (11) or (12).

Additionally, in this embodiment, step S4 indicated in FIG. 4 constitutes one example of the "representative-active-time determining step" set forth in the above mode (13), and steps S5 to S7 indicated in FIG. 4 together constitute one example of the "bottleneck determining step" set forth in the same mode.

Further, in this embodiment, step S5 indicated in FIG. 4 constitutes one example of the "accuracy determining step" set forth in the above mode (15), and steps S6 and S7 together constitute one example of the "bottleneck determining step" set forth in the same mode.

Still further, in this embodiment, the system-entity-effect-level determination program indicated in FIG. 3 constitutes one example of the "program" set forth in the above mode (44).

Yet further, in this embodiment, the storage 14 indicated in FIG. 3 constitutes one example of the "recording medium" set forth in the above mode (45).

There will be next described a second embodiment of the present invention.

This embodiment is different from the first embodiment in a system-entity-effect-level determination program as a software element, and identical with the first embodiment in hardware elements. With this in mind, the same reference numerals as used in the first embodiment will be used in this embodiment to identify the functionally corresponding elements in the interest of simplification of the following description, and only the system-entity-effect-level determination program will be described.

As described before, the first embodiment constitutes a manner to practice the present invention in a steady state system, irrespective of whether or not the system is of type allowing the occurrence of a non steady state. To the contrary, this embodiment constitutes a manner to practice the present invention in a non steady state system.

This embodiment is implemented to detect in real time, during actual operation of the non steady state system, at least one of a plurality of entities together constituting the system which at least one currently functions as at least one bottleneck.

Figure 9:
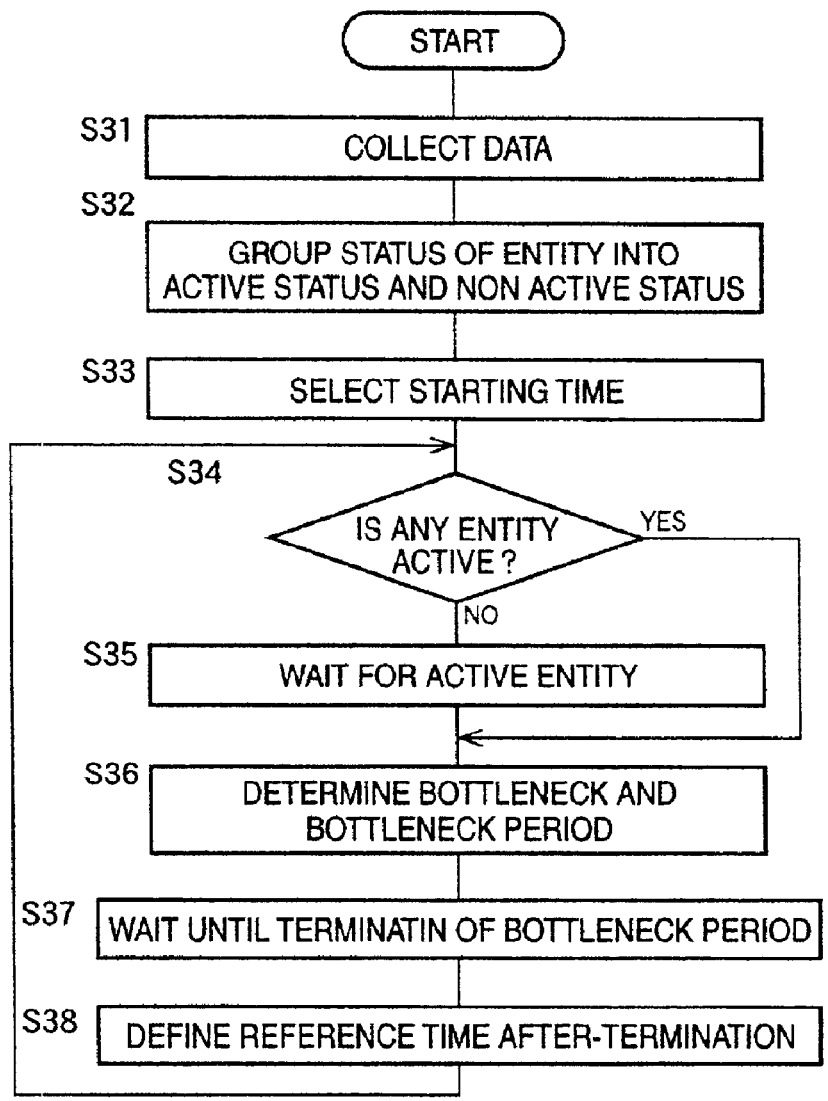
FIG. 9 is a flow chart schematically illustrating a system-entity-effect-level determination program executed for implementing a system-entity-effect-level determining method constructed according to a second embodiment of the present invention.

Referring then to FIG. 9, there is schematically illustrated with a flow chart a system-entity-effect-level determination program included in this embodiment.

The system-entity-effect-level determination program is initiated with step S31 in which, like in step S1 indicated in FIG. 4, data indicative of the status of the non steady state system is collected. The data is sequentially updated as the system operation progresses, and the data therefore represents how the statuses of each entity changes over time during the past and current time, not during the future.

Step S31 is followed by step S32 in which, like in step S2 indicated FIG. 4, the statuses of each entity presented during the past or at the current time are grouped into an active status and a non active status.

Subsequently, in step S33, the starting time of the bottleneck analysis is selected by the user. In this embodiment, since the bottleneck analysis is performed in operation of the actual non steady state system, the starting time is selected equal to the actual current time.

Following that, in step S34, a determination as to whether or not any of the entities are active at the current time is made. As exemplified in FIG. 10, if no entities are active, the determination then becomes negative ("NO"), and this program proceeds to step S35. Alternately, as exemplified in FIG. 11, if one or more entities are active, the determination made in step S34 becomes affirmative ("YES"), step S35 is skipped and this program proceeds to step S36.

Figure 10:
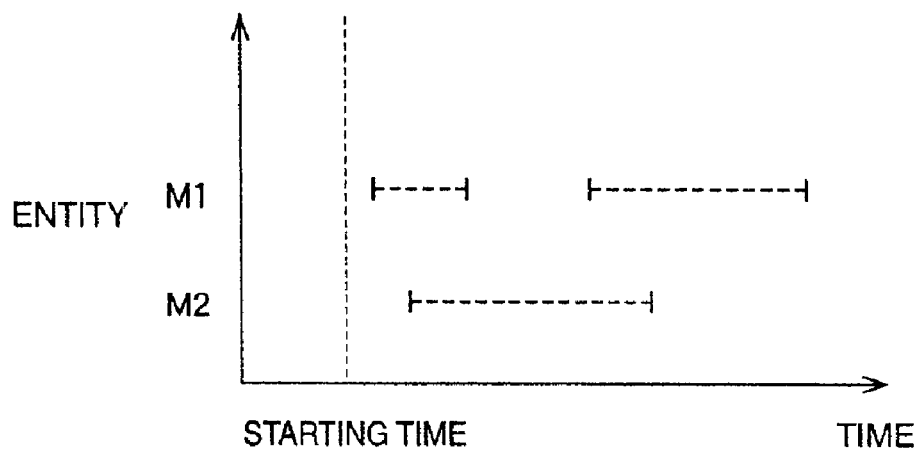
FIG. 10 is a graph for illustratively explaining the system-entity-effect-level determination program indicated in FIG. 9.
Figure 11:
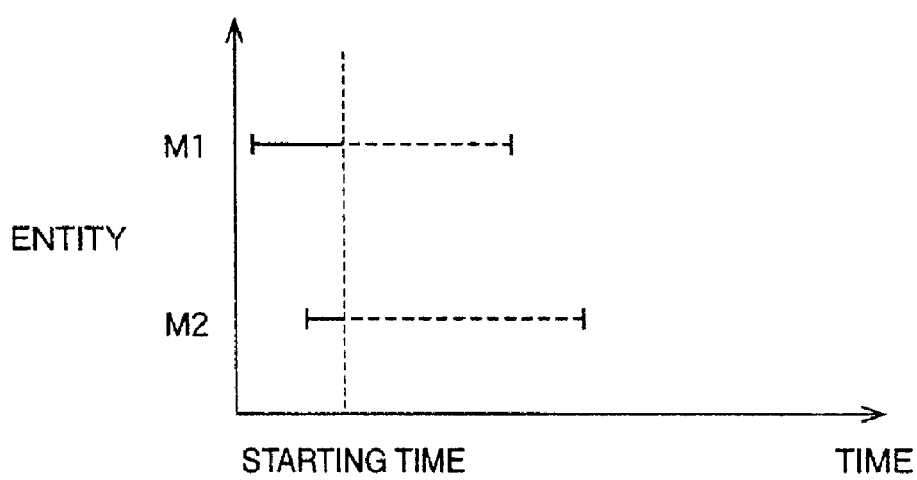
FIG. 11 is another graph for illustratively explaining the system-entity-effect-level determination program indicated in FIG. 9.
Figure 12:
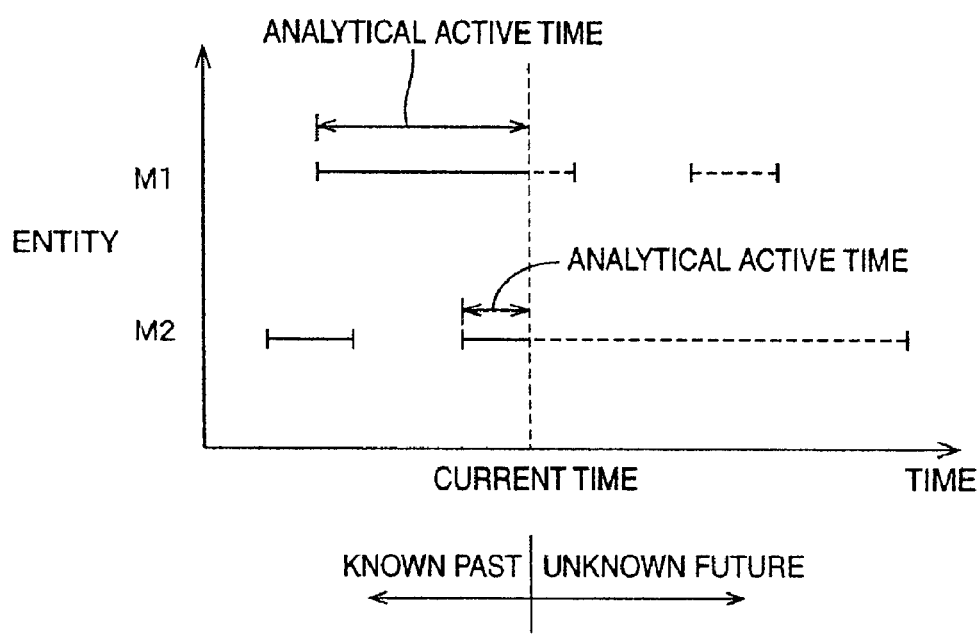
FIG. 12 is still another graph for illustratively explaining the system-entity-effect-level determination program indicated in FIG. 9.

It is noted that the laterally extending dotted lines depicted in FIGS. 10 and 11 demonstrate that the corresponding entities are active, and that the statuses of the corresponding entities are unknown during the future beyond the current time, i.e., the aforementioned starting time.

In addition, the laterally extending solid lines depicted in FIG. 11 demonstrate that the corresponding entities are active over the coverage of the solid lines, and that the statuses of the corresponding entities are known during the past before the current time.

In step S35, this program waits until one or more entities become active. During implementation of step S35, the current time is continuously updated.

Step 35 only applies if there are no entities active at the current time. If no entities are active, it is then determined that there is no bottleneck in the system. This is true until one or more entities become active.

Step S35 is followed by step S36 in which it is required that at least one entity is active at the current time, and this is ensured by implementation of steps S34 and S35. In step S36, at least one of the entities functioning as at least one bottleneck is determined, on the basis of the relationship in magnitude between at least one active time determined for at least one of entities being active at the current time.

Specifically, if only one entity is active at the current time, the entity is then automatically determined as the bottleneck. On the other hand, if plural entities are together active at the current time, the entity with the longest active time is determined as the bottleneck.

It is noted that, in view of the fact that the length of the active time for each entity reflects at which level each entity functions as the bottleneck, the present invention may be practiced, such that, among plural entities being together active at the same time, the entity with the longest active time is determined as the strongest bottleneck, and the entity with the second longest active time is determined as the second strongest bottleneck.

It is further noted that the present invention may be practiced, such that if plural entities each have the longest active time, all the plurality entities are determined as the bottlenecks.

In this embodiment, the data indicative of the non steady state system fail to identify its future behavior, with the result that the active period (i.e., analytical active period) for an entity being in an active status in the current time is determined in the form of the period from the starting time of the active status up to the current time, and that the length of the active period is allowed to be the active time (i.e., analytical active time).

In step S36, further, a bottleneck period is set for the active period for the entity determined as the bottleneck as described above. In an example illustrated in FIG. 13, the bottleneck period is set for entity M2 for the overall active period.

Subsequently, in step S37, this program waits until the bottleneck period determined for the last bottleneck is terminated. Thereafter, in step S38, a reference time after-termination, which is defined as the time after termination of the bottleneck period, is set to the current time.

Following that, this program returns to step S34, and the loop of steps S34 to S38 is then executed again.

Figure 13:
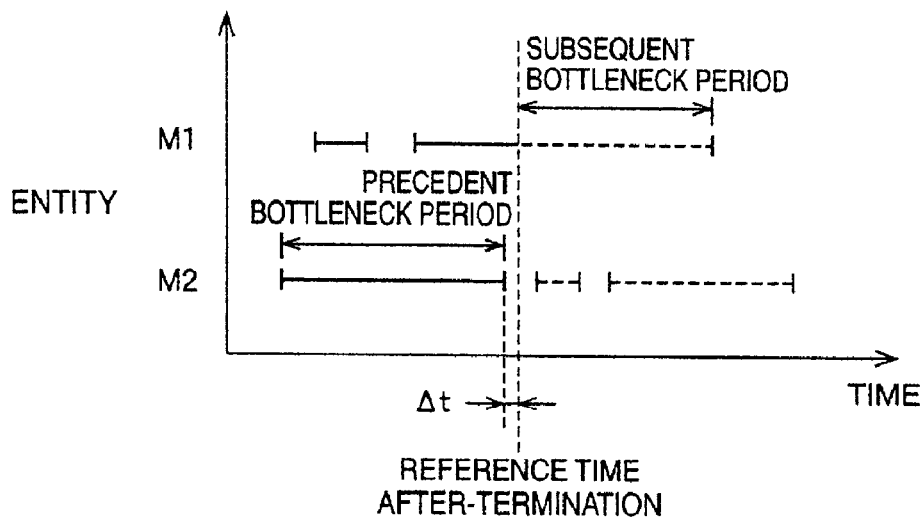
FIG. 13 is a further graph for illustratively explaining the system-entity-effect-level determination program indicated in FIG. 9.

During the current execution of the above loop, in the case of an example illustrated in FIG. 13, one entity M1 is uniquely active at the reference time after-termination being equal to the current time, resulting in execution of step S36 to automatically determine entity M1 as a new bottleneck.

Figure 14:
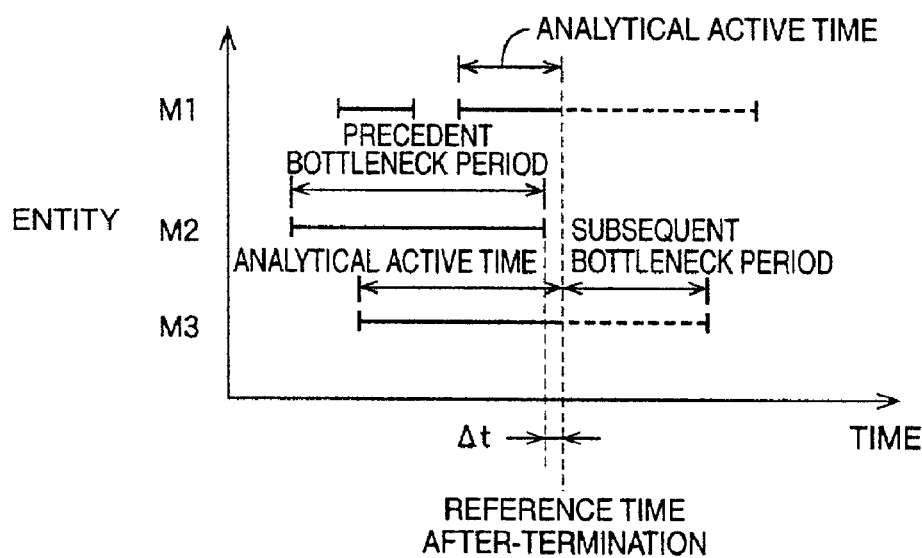
FIG. 14 is a still further graph for illustratively explaining the system-entity-effect-level determination program indicated in FIG. 9.

On the other hand, in the case of an example illustrated in FIG. 14, two entities M1, M3 are together active at the reference time after-termination being equal to the current time, resulting in execution of step S36 to compare the active times (i.e., analytical active times) of entities M1, M3 each other, thereby determining entity M3 as a new bottleneck.

In the example illustrated in FIG. 13, there is an overlap between the active period of the precedent (or previous) bottleneck: entity M2; and the active period of the subsequent (or current) bottleneck: entity M1.

In this case, step S36 indicated in FIG. 9 is implemented to define, for entity M1, a portion of the active period for entity M1 excluding the overlap with the precedent bottleneck period as the subsequent bottleneck period. In other words, the subsequent bottleneck period for the subsequent bottleneck is defined as a result of excluding the overlap.

The execution of the loop of steps S34 to S38 is repeated as long as desired.

As will be apparent from the above explanation, this embodiment would provide the following advantages optionally or altogether:

(a) This embodiment allows detection of the current bottleneck of the system at any time.

(b) This embodiment allows detection of the bottleneck of the system within a time interval.

(c) This embodiment allows a real time monitoring of the system bottleneck.

(d) This embodiment allows detection of the change of the system bottleneck due to changes in the system.

(e) This embodiment allows detection of the change of the system bottleneck due to random variation or events in the system.

(f) This embodiment allows monitoring of the shifting of the bottleneck from one entity to another entity.

(g) This embodiment allows, due to its real time bottleneck detection, a real time improvement of the system to maximize its efficiency.

As will be readily understood from the above description, in this embodiment, step S31 indicated in FIG. 9 constitutes one example of the "collecting step" set forth in the above mode (1), step S32 constitutes one example of the "classifying step" set forth in the same mode, part of step S36 constitutes one example of the "active-time determining step" set forth in the same mode, and steps S34 and S35, the remaining part of step S36, and steps S37 and S38 together constitute one example of the "effect-level determining step" set forth in the same mode.

Further, in this embodiment, steps S34 and S35, the remaining part of step S36, and steps S37 and S38 all indicated in FIG. 9 together constitute one example of the "effect-level determining step" set forth in the above mode (2).

Still further, in this embodiment, part of step S36 indicated in FIG. 9 constitutes one example of the "bottleneck determining step" set forth in any one of the above modes (8), (17) to (21), and (25).

Yet further, in this embodiment, part of step S36 indicated in FIG. 9 constitutes one example of the "bottleneck determining step" set forth in the above modes (24), and another part of step S36 constitutes one example of the "active-period determining step" set forth in the same mode.

There will be next described a third embodiment of the present invention.

This embodiment is different from the second embodiment in a system-entity-effect-level determination program as a software element, and identical with the second embodiment in hardware elements. With this in mind, the same reference numerals as used in the second embodiment will be used in this embodiment to identify the functionally corresponding elements in the interest of simplification of the following description, and only the system-entity-effect-level determination program will be described.

The second embodiment performs a real time analysis to analyze in real time during operation of a non steady state system a bottleneck of the system.

Alternately, this embodiment performs a historical/by-simulation analysis to analyze a bottleneck, on the basis of historical data indicative of the past behavior of a non steady state system, or simulation data indicative of behaviors of a non steady state system, which simulation data is the analysis results by simulation for the non steady state system.

Figure 15:
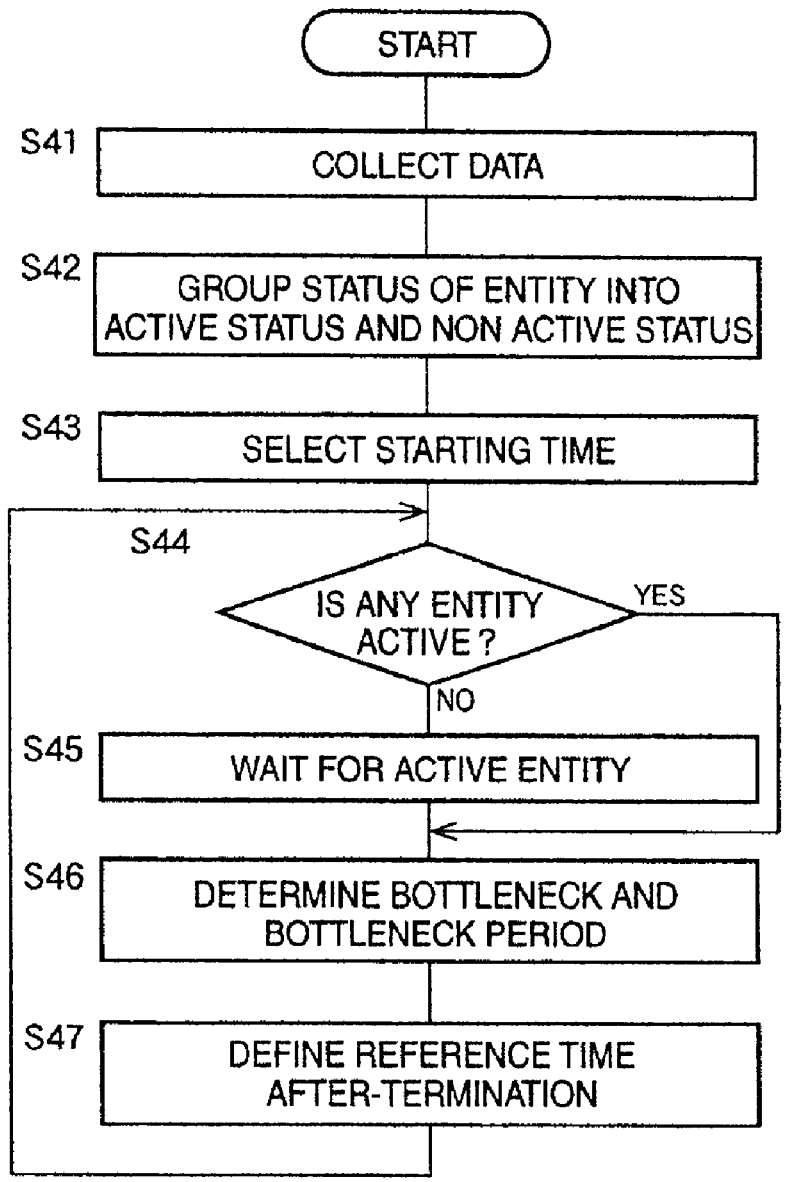
FIG. 15 is a flow chart schematically illustrating a system-entity-effect-level determination program executed for implementing a system-entity-effect-level determining method constructed according to a third embodiment of the present invention.

Referring then to FIG. 15, there is schematically illustrated with a flow chart a system-entity-effect-level determination program included in this embodiment.

This program is basically identical with the system-entity-effect-level determination program included in the second embodiment.

With this in mind, this program will be below described simply for the identical steps, and in detail for the different steps.

This program is initiated with step S41 in which, like in step S31 indicated in FIG. 9, there is collected the historical data or simulation data indicative of the behavior of the non steady state system. The data has the same format as in the first embodiment.

Subsequently, in step S42, like in step S32 indicated in FIG. 9, the statuses of each entity are grouped into an active status and a non active status.

Afterward, in step S43, like in step S33 indicated in FIG. 9, the starting time of the bottleneck analysis is selected. It is noted that, in this embodiment, unlike in the second embodiment, the starting time is allowed to be set to the current point in virtual time which point can be designated at any point on a virtual time base for the bottleneck analysis using the historical data or the simulation data. The historical/by-simulation analysis, as opposed to the real time analysis, has no limitations in representing the future state or behavior of the non steady state system, using the data collected until the current point in actual time.

Step S43 is followed by step S44 in which, like in step S34 indicated in FIG. 9, it is determined if any of the entities in the system are active at the current time. It is noted that, in this embodiment, the term "current time" means the time at which the current cycle of execution of step S44 occurs, eliminating the need to strictly reflect the current point in actual time during operation of the system.

Thereafter, in step S45, for achieving the same purpose as step S35 indicated in FIG. 9, this program waits until one or more entities become active. In step S35 indicated in FIG. 9, due to the unknown future behavior of the non steady state system in the second embodiment, step S35 waits until one or more entities become active with the elapse of the actual time. To the contrary, in this embodiment, due to the known behavior of the non steady state system throughout time, step S45 merely sets the current point in time to the starting time of the active status of one or more entities, not meaning that step S45 waits until one or more entities become active with the elapse of the actual time.

Following that, in step S46, like in step S36 indicated in FIG. 9, the active time is determined, and, based on the determined active time, the bottleneck and the bottleneck period are determined.

It is noted that, in this embodiment, unlike in the second embodiment, the period from the starting time up to the termination time, of a cycle of the active status, is determined as the active period, the length of which is allowed to be the active time.

In addition, in this embodiment, like in the second embodiment, the newest bottleneck period for the newest bottleneck is allowed to be defined as a result of excluding its overlap with the active period for the precedent bottleneck.

Step S46 is followed by step S47 in which the reference time after-termination is determined by adding an infinitesimal short time increase Δt to the termination time of the active period for the newest bottleneck.

Referring then to FIGS. 13 and 14, there is illustrated the manner in which the reference time after-termination is determined by adding the time increase Δt to the termination time, where the active period for the newest bottleneck is the precedent bottleneck period. Unlike in step S47, the corresponding step in the second embodiment waits until the newest bottleneck period is terminated, and if it is terminated at a termination time, the reference time after-termination is defined just as the time immediately after the termination time.

However, in any case, it follows that the reference time after-termination is defined as a point in time apart from the termination time of the active period of the newest bottleneck toward the future by an infinitesimal short time.

As will be readily understood from the above description, in this embodiment, step S41 indicated in FIG. 15 constitutes one example of the "collecting step" set forth in the above mode (1), step S42 constitutes one example of the "classifying step" set forth in the same mode, part of step S46 constitutes one example of the "active time determining step" set forth in the same mode, and steps S44 and S45, the remaining part of step S46, and step S47 together constitute one example of the "effect-level determining step" set forth in the same mode.

Further, in this embodiment, steps S44 and S45, the remaining part of step S46, and step S47 all indicated in FIG. 15 together constitute one example of the "effect-level determining step" set forth in the above mode (2).

Still further, in this embodiment, part of step S46 indicated in FIG. 15 constitutes one example of the "bottleneck determining step" set forth in any one of the above modes (8), (17) to (21), and (31).

Yet further, in this embodiment, part of step S46 indicated in FIG. 15 constitutes one example of the "bottleneck determining step" set forth in the above modes (28), and another part of step S46 constitutes one example of the "active period determining step" set forth in the same mode.

There will be next described a fourth embodiment of the present invention.

This embodiment is different from the third embodiment in a system-entity-effect-level determination program as a software element, and identical with the third embodiment in hardware elements. With this in mind, the same reference numerals as used in the third embodiment will be used in this embodiment to identify the functionally corresponding elements in the interest of simplification of the following description, and only the system-entity-effect-level determination program will be described.

The third embodiment is implemented, such that once the precedent bottleneck period has been determined for the active period for the precedent bottleneck, which precedent bottleneck period has an overlap with the active period for the subsequent bottleneck, the determined precedent bottleneck period will not be corrected in order to define the overlap as the shifting period allowing the shifting of the bottleneck.

By contrast, this embodiment is implemented, such that the once determined precedent bottleneck period, if it is subsequently found that the precedent bottleneck period has an overlap with the active period for the subsequent bottlenecks, is corrected to define the overlapping period as the shifting period.

The determination of the shifting period as described above means that there is a clear distinction between the period during which each entity function as the bottleneck (i.e., the presence as the sole or unique bottleneck at each point in time), and the period during which each entity functions as the shifting bottleneck (i.e., the coexistence with another bottleneck at each point in time).

Accordingly, this embodiment readily allows an accurate detection of the period for each entity to function as the bottleneck; and the period for each entity to function as the shifting bottleneck.

In this embodiment, as opposed to in the first embodiment, the starting times and the termination times of all the active periods that each entity had are known ahead of the determination of the bottleneck. Therefore, this embodiment would make it easier to detect the real bottleneck alone with certainty.

Figure 16:
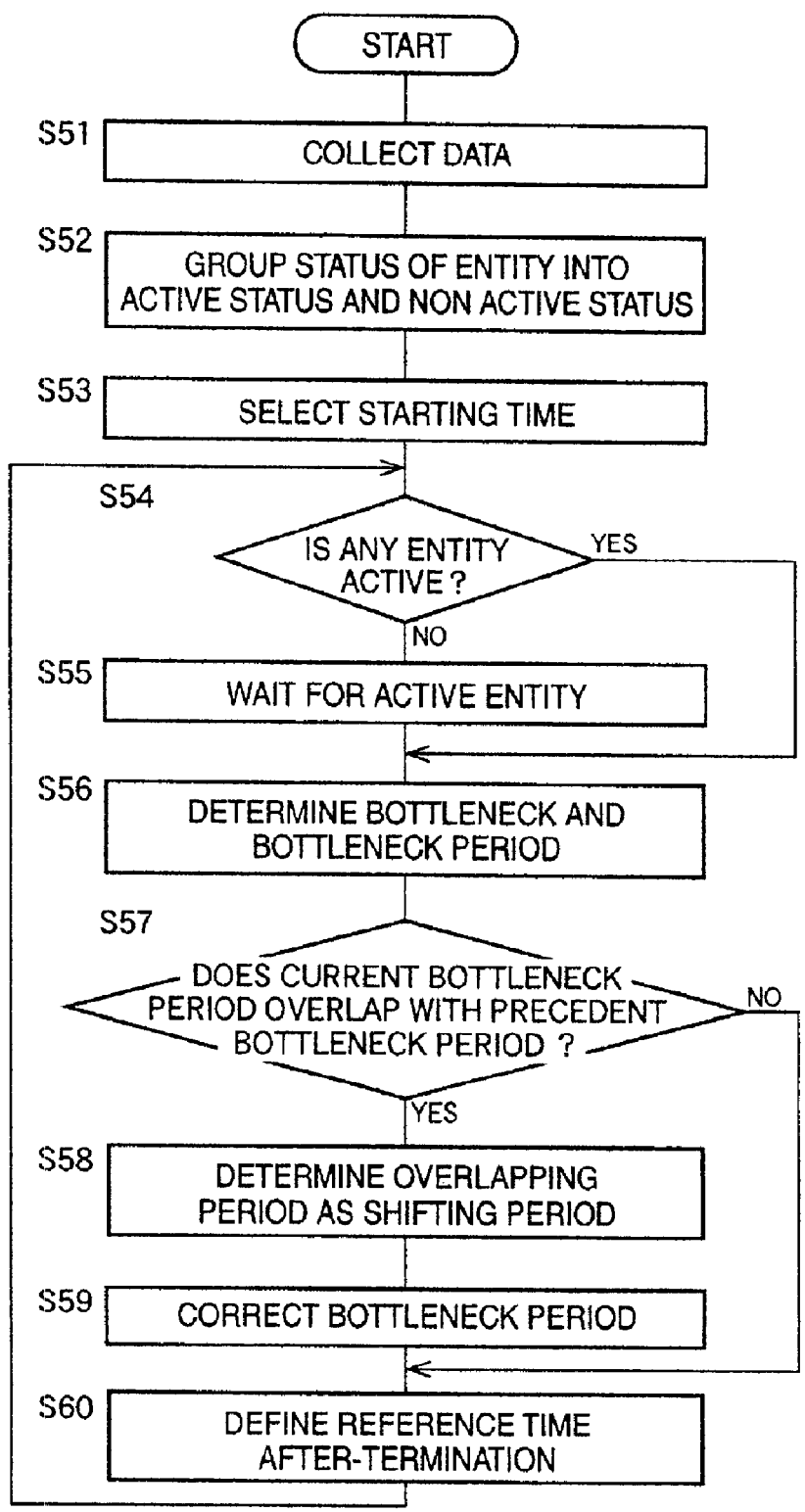
FIG. 16 is a flow chart schematically illustrating a system-entity-effect-level determination program executed for implementing a system-entity-effect-level determining method constructed according to a fourth embodiment of the present invention.

Referring then to FIG. 16, there is schematically illustrated with a flow chart a system-entity-effect-level determination program included in this embodiment.

This program is basically identical with the system-entity-effect-level determination program included in the third embodiment.

With this in mind, this program will be below described simply for the identical steps, and in detail for the different steps.

This program is initiated with steps S51 to S55 to be implemented like in steps S41 to S45 indicated in FIG. 15.

Thereafter, in step S56, like in step S46 indicated in FIG. 15, the current bottleneck and the current bottleneck period are determined on the basis of the active time. It is noted that this embodiment, as opposed to the third embodiment, provisionally defines the current bottleneck period over the whole active period of the current bottleneck.

Subsequently, in step S57, a determination as to whether the determined current bottleneck period overlaps with the precedent bottleneck period. If the current bottleneck period has no overlap with the precedent bottleneck period, the determination then becomes negative ("NO"), and steps S58 and S59 are skipped and this program proceeds to step S60. In step S60, like in step S47 indicated in FIG. 15, the reference time after-termination is defined.

In step S58, the overlap of the current bottleneck period with the precedent bottleneck period is determined as the shifting period. During this shifting period, the entity determined as the current bottleneck functions as the shifting bottleneck. Similarly, the overlap of the precedent bottleneck period with the current bottleneck period is determined as the shifting period. During this shifting period, the entity determined as the precedent bottleneck functions as the shifting period.

In step S59, the current bottleneck period is corrected or redefined to exclude the thus defined shifting period from the resulting current bottleneck period.

Figure 17:
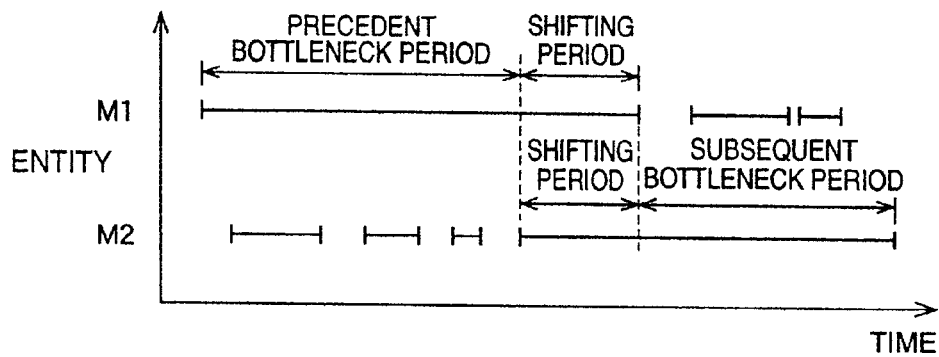
FIG. 17 is a graph for illustratively explaining the system-entity-effect-level determination program indicated in FIG. 16.

Consequently, in an example shown in FIG. 17, where the subsequent bottleneck falls under the current bottleneck, while the provisional precedent bottleneck period, as not shown, for entity M1, is corrected into a combination of the final precedent bottleneck period and the shifting period, the provisional subsequent bottleneck period for entity M1 is corrected into a combination of the final subsequent bottleneck period and the shifting period.

It is added that while the shifting of the bottleneck during the overlapping period between the active period for the precedent bottleneck and the active period for the subsequent bottleneck is defined as a continuous event in the above description, the shifting may accept other definitions.

Figure 18:
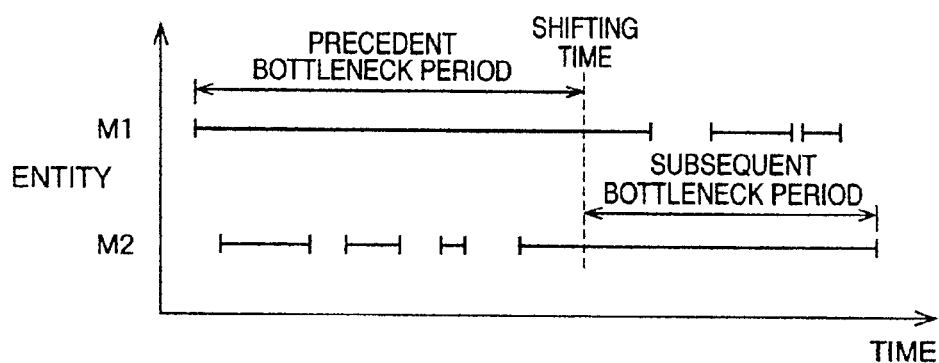
FIG. 18 is a graph for illustratively explaining an example of improvement of the system-entity-effect-level determination program indicated in FIG. 16, which example differs in the definition of a shifting of bottleneck from the system-entity-effect-level determination program indicated in FIG. 16.

By way of example, the shifting of the bottleneck may be defined as an instantaneous or discrete event. By the definition, as indicated in FIG. 18, for example, the shifting period during the bottleneck shifts from an entity M1 into another entity M2 is defined as meaning a selected one point in time within the overlapping period of the active period of the precedent bottleneck and the active period of the subsequent bottleneck.

Figure 19:
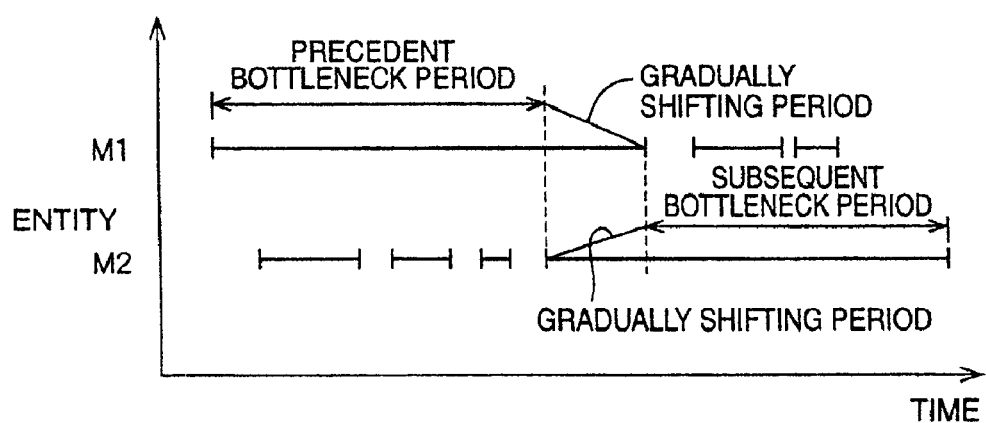
FIG. 19 is a graph for illustratively explaining another example of improvement of the system-entity-effect-level determination program indicated in FIG. 16, which example differs in the definition of a shifting of bottleneck from the system-entity-effect-level determination programs indicated in FIGS. 16 and 18.

In addition, the shifting of the bottleneck may be also defined as a gradual event. By the definition, as indicated in FIG. 19, for example, the shifting period during the bottleneck gradually shifts from an entity M1 into another entity M2 is defined as meaning the overlapping period of the active period of the precedent bottleneck and the active period of the subsequent bottleneck.

It is further added that this embodiment is implemented with the historical/by-simulation analysis, such that if it is determined that the previously determined precedent bottleneck period has an overlap with the active period for the subsequent bottleneck, the previously determined precedent bottleneck period is later corrected so as to identify the overlap as the shifting period. The present invention, however, may be practiced with the later correction for the real time analysis.

As will be readily understood from the above description, in this embodiment, step S51 indicated in FIG. 16 constitutes one example of the "collecting step" set forth in the above mode (1), step S52 constitutes one example of the "classifying step" set forth in the same mode, part of step S56 constitutes one example of the "active-time determining step" set forth in the same mode, and steps S54 and S55, the remaining part of step S56, and steps S57 to S60 together constitute one example of the "effect-level determining step" set forth in the same mode.

Further, in this embodiment, steps S54 and S55, the remaining part of step S56, and steps S57 to S60 all indicated in FIG. 16 together constitute one example of the "effect-level determining step" set forth in the above mode (2).

Still further, in this embodiment, part of step S56 indicated in FIG. 16 constitutes one example of the "bottleneck determining step" set forth in any one of the above modes (8), (17) to (21), and (31) to (34).

Yet further, in this embodiment, step S58 indicated in FIG. 16 constitutes one example of the "shifting bottleneck determining step" set forth in the above modes (22) or (23).

Additionally, in this embodiment, part of step S56 indicated in FIG. 16 constitutes one example of the "bottleneck determining step" set forth in the above modes (28), and another part of step S56 constitutes one example of the "active-period determining step" set forth in the same mode.

Next a fifth embodiment of the present invention will be described.

This embodiment is different from the fourth embodiment in a system-entity-effect-level determination program as a software element, and identical with the fourth embodiment in hardware elements. With this in mind, the same reference numerals as used in the fourth embodiment will be used in this embodiment to identify the functionally corresponding elements in the interest of simplification of the following description, and only the system-entity-effect-level determination program will be described.

This embodiment is implemented, such that where the active period for one of the entities of the non steady state system intervenes between the precedent and the subsequent bottleneck period, the one entity is determined as an intermediate bottleneck between two entities in the course of the bottleneck shifting from an entity determined for the precedent bottleneck period into another entity determined for the subsequent bottleneck.

Figure 20:
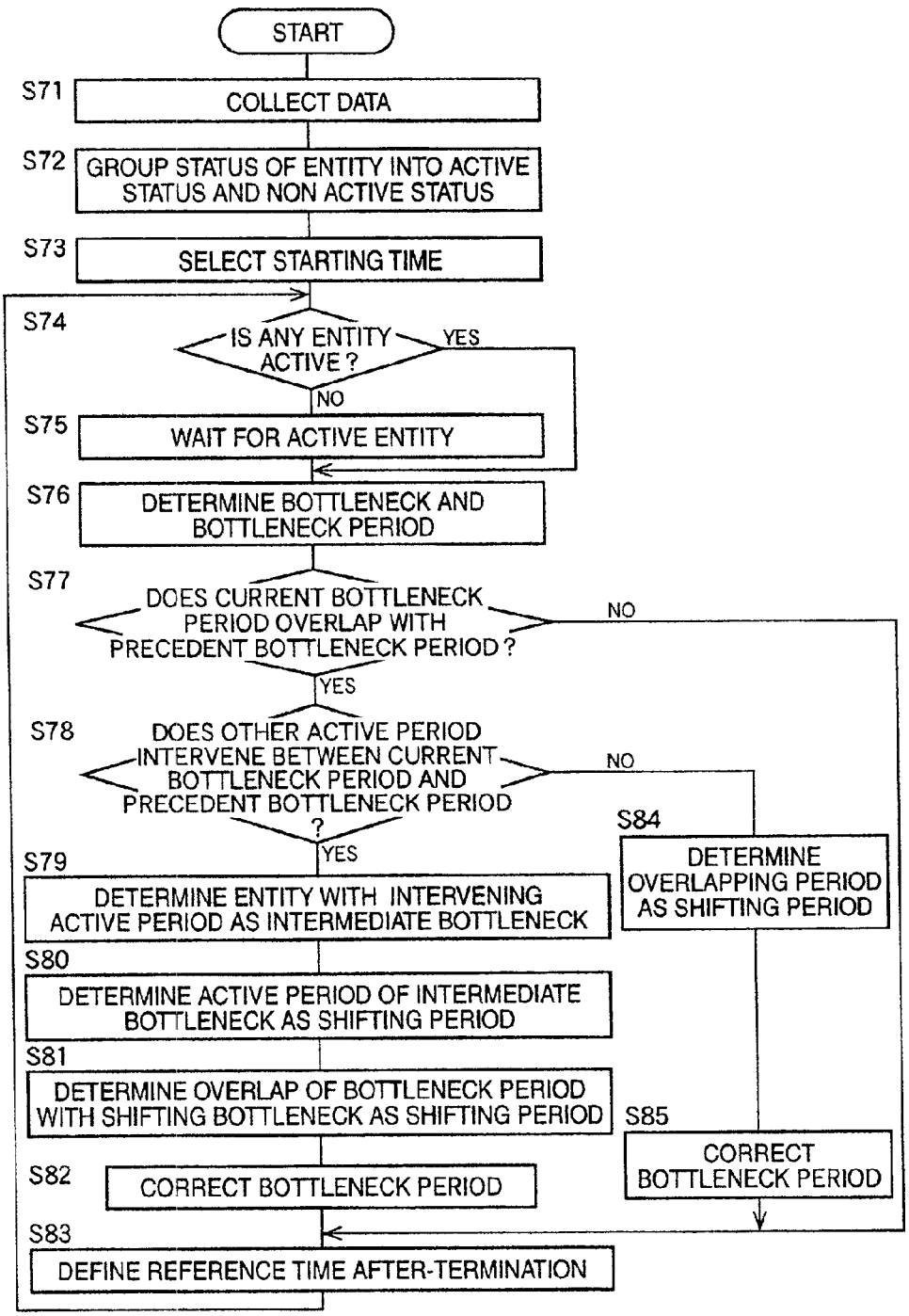
FIG. 20 is a flow chart schematically illustrating a system-entity-effect-level determination program executed for implementing a system-entity-effect-level determining method constructed according to a fifth embodiment of the present invention.

Referring then to FIG. 20, there is schematically illustrated with a flow chart a system-entity-effect-level determination program included in this embodiment.

This program is basically identical with the system-entity-effect-level determination program included in the fourth embodiment.

With this in mind, this program will be below described simply for the identical steps, and in detail for the different steps.

This program is initiated with steps S71 to S77 to be executed like steps S51 to S57 indicated in FIG. 16.

Thereafter, if the determination of step S77 is negative ("NO"), step S83 is implemented to define the reference time after-termination, like step S60 indicated in FIG. 16.

On the other hand, if the determination of step S77 is affirmative ("YES"), step S78 is implemented to determine if an additional active period intervenes between the precedent and the current bottleneck period.

If it is assumed that such an additional period is absent, the determination of step S78 becomes negative ("NO"), this program proceeds to step S84.

In step S84, like in step S58 indicated in FIG. 16, the overlapping period is determined as the shifting period. Subsequently, in step S85, like in step S59 indicated in FIG. 16, the provisionally determined bottleneck period is corrected as a result of excluding the shifting period from the provisionally determined bottleneck period. Then this program proceeds to step S83.

Figure 21:
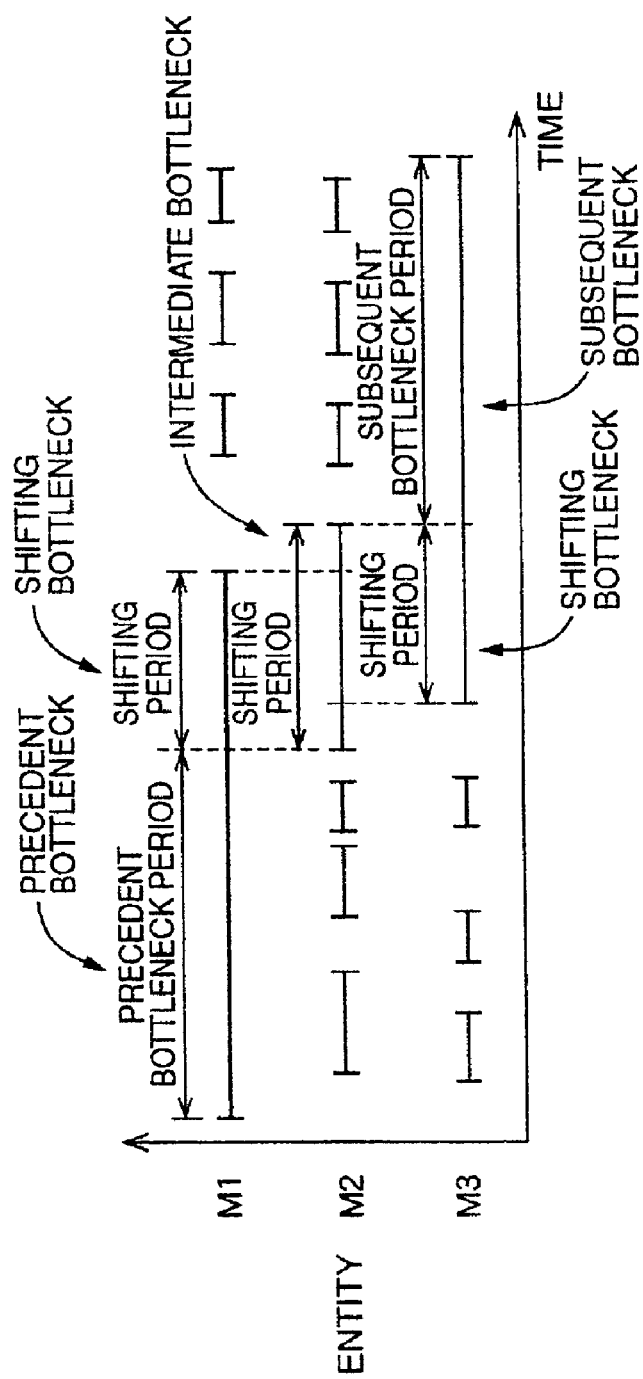
FIG. 21 is a graph for illustratively explaining the system-entity-effect-level determination program indicated in FIG. 20.

By contrast, if it is assumed, as in an example illustrated in FIG. 21, that an additional active period intervenes between the provisional precedent and the provisional current bottleneck period, the determination of step S78 becomes affirmative ("YES"). Subsequently, in step S79, the entity with the intervening additional active period is determined as the intermediate bottleneck.

For the example depicted in FIG. 21, it follows that entity M2 is determined as the intermediate bottleneck.

Thereafter, in step S80, the active period of the determined intermediate bottleneck is determined as the shifting period.

For the example depicted in FIG. 21, it follows that the overall active period of entity M2 functioning as the intermediate bottleneck is determined as the shifting bottleneck.

Following that, in step S81, there is determined as the shifting period an overlap of the provisionally determined current bottleneck period with the shifting period for the intermediate bottleneck. Similarly, there is determined as the shifting period an overlap of the provisionally determined precedent bottleneck period with the shifting period for the intermediate bottleneck.

Subsequently, in step S82, the provisional current bottleneck period is corrected so as to exclude therefrom the shifting period, and the corrected current bottleneck period is allowed to be the final current bottleneck period. Similarly, the provisional precedent bottleneck period is corrected so as to exclude therefrom the shifting period, and the corrected precedent bottleneck period is allowed to be the final precedent bottleneck period.

With the result that, for the example illustrated in FIG. 21, where the subsequent bottleneck qualifies as the current bottleneck, while the provisional precedent bottleneck period for entity M1 is corrected into a combination of the final precedent bottleneck period and the shifting period, the provisional subsequent bottleneck period for entity M3 is corrected into a combination of the final subsequent bottleneck period and the shifting period.

Then, this program proceeds to step S83.

As will be readily understood from the above description, in this embodiment, step S71 indicated in FIG. 20 constitutes one example of the "collecting step" set forth in the above mode (1), step S72 constitutes one example of the "classifying step" set forth in the same mode, part of step S76 constitutes one example of the "active-time determining step" set forth in the same mode, and steps S74 and S75, the remaining part of step S76, and steps S77 to S85 all indicated in FIG. 20 together constitute one example of the "effect-level determining step" set forth in the same mode.

Further, in this embodiment, steps S74 and S75, the remaining part of step S76, and steps S77 to S85 all indicated in FIG. 20 together constitute one example of the "effect-level determining step" set forth in the above mode (2).

Still further, in this embodiment, part of step S76 indicated in FIG. 20 constitutes one example of the "bottleneck determining step" set forth in any one of the above modes (8), (17) to (21), and (30) to (34).

Yet further, in this embodiment, step S81 indicated in FIG. 20 constitutes one example of the "shifting bottleneck determining step" set forth in the above modes (22) or (23).

Additionally, in this embodiment, part of step S76 indicated in FIG. 20 constitutes one example of the "bottleneck determining step" set forth in the above modes (28), and another part of step S76 constitutes one example of the "active-period determining step" set forth in the same mode.

There will be next described a sixth embodiment of the present invention.

This embodiment is different from the fourth embodiment in a system-entity-effect-level determination program as a software element, and identical with the fourth embodiment in hardware elements. With this in mind, the same reference numerals as used in the fourth embodiment will be used in this embodiment to identify the functionally corresponding elements in the interest of simplification of the following description, and only the system-entity-effect-level determination program will be described.

This embodiment is implemented, such that, during a designated analysed period, at least one bottleneck period and at least one shifting period are determined per entity, and subsequently, a representative value of the at least one bottleneck period and a representative value of the at least one shifting period are calculated per entity. Based on these representative values, and in association with the designated analysed period, a representative bottleneck representing plural bottlenecks and a representative shifting bottleneck representing plural shifting bottlenecks are determined.

That is, this embodiment is implemented, such that, using at least one bottleneck and at least one shifting bottleneck each determined in association with time, the above representative bottleneck and the above representative shifting bottleneck are determined in association with a designated analysed period to which these bottleneck and shifting bottleneck belong.

Figure 22:
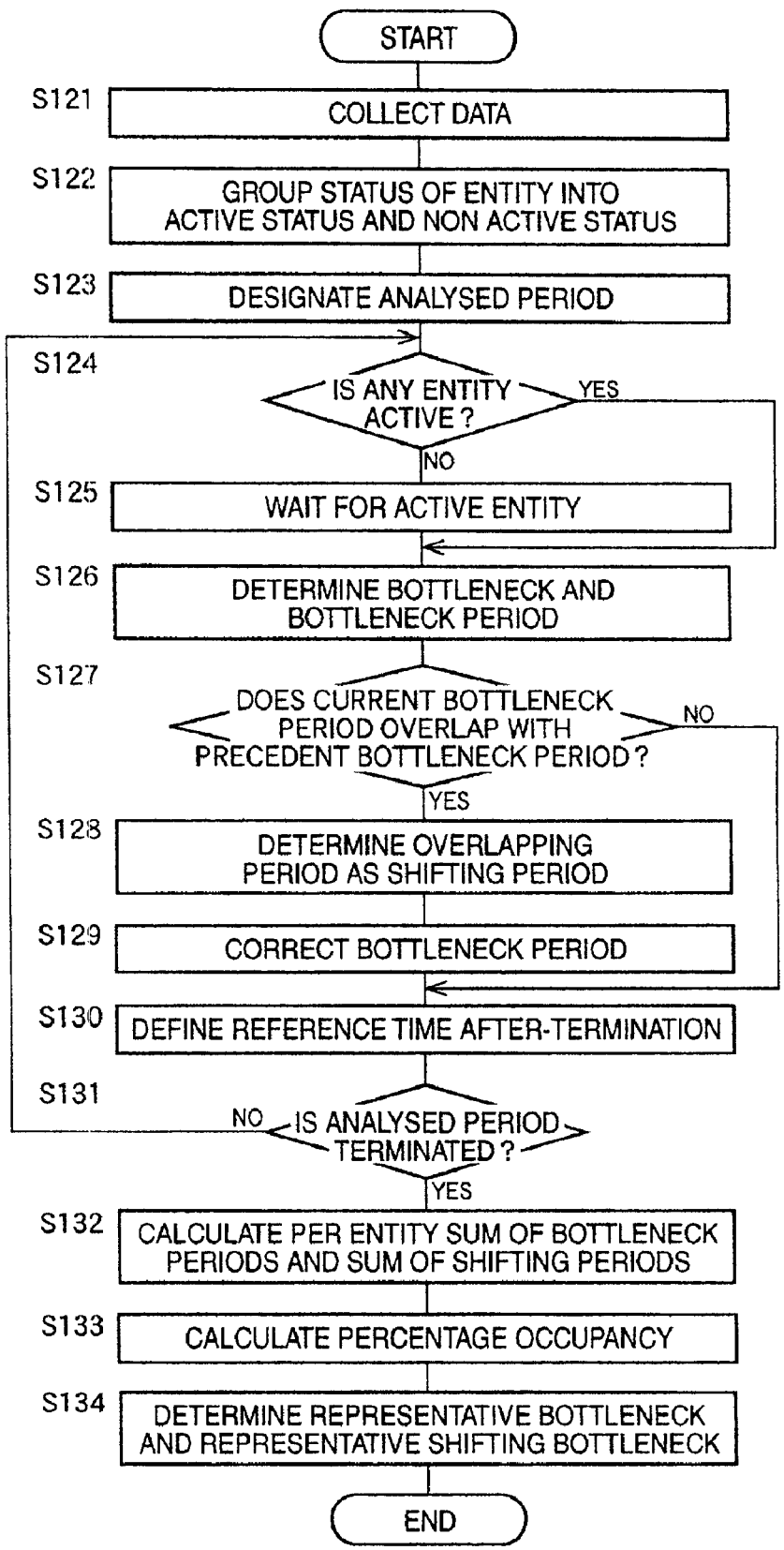
FIG. 22 is a flow chart schematically illustrating a system-entity-effect-level determination program executed for implementing a system-entity-effect-level determining method constructed according to a sixth embodiment of the present invention.

Referring then to FIG. 22, there is schematically illustrated with a flow chart a system-entity-effect-level determination program included in this embodiment.

This program is basically identical with the system-entity-effect-level determination program included in the fourth embodiment.

With this in mind, this program will be below described simply for the identical steps, and in detail for the different steps.

This program is initiated with steps S121 and S122 to be executed like steps S51 and S52 indicated in FIG. 16.

Subsequently, step S123 is implemented for allowing the user to designate an analysed period. The designated analysed period may be defined with its starting time and its termination time, or may be defined with its starting time and the length of the designated analysed period. In addition, the designated analysed period may be set to, where the non steady state system is used in a manufacturing line, the last 15 minutes, the last 1 year, one shift meaning one cycle time on duty for human workers under a shift system.

Thereafter, steps S124 to S130 are implemented like steps S54 to S60 indicated in FIG. 16.

Figure 23:
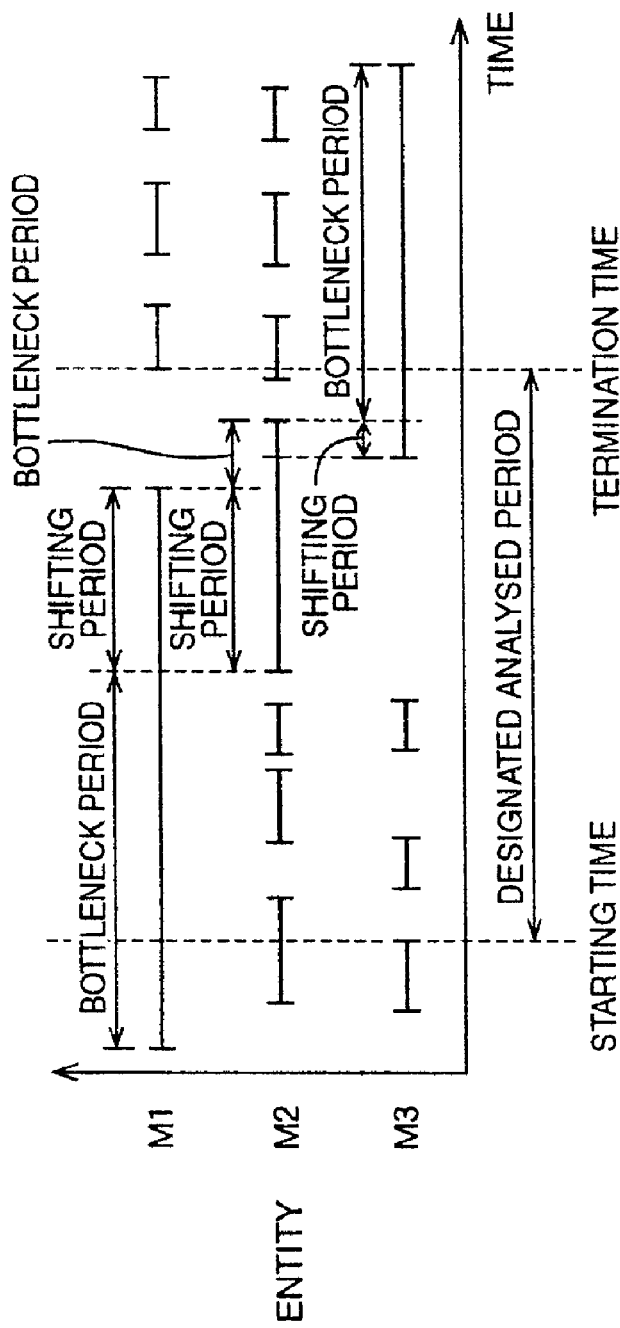
FIG. 23 is a graph for illustratively explaining the system-entity-effect-level determination program indicated in FIG. 22.

Subsequently, in step S131, a determination as to whether the designated analysed period has elapsed. If it has not elapsed, the determination becomes negative ("NO"), this program returns to step S124. Following that, if the designated analysed period has elapsed as a result of the repeated executions of steps S124 to S131, the determination of step S131 becomes affirmative ("YES"). FIG. 23 shows an example of the analysis results during the designated analysed period.

Thereafter, in step S132, the sum of the at least one bottleneck period and the sum of the at least one shifting period are calculated per entity.

Figure 24:
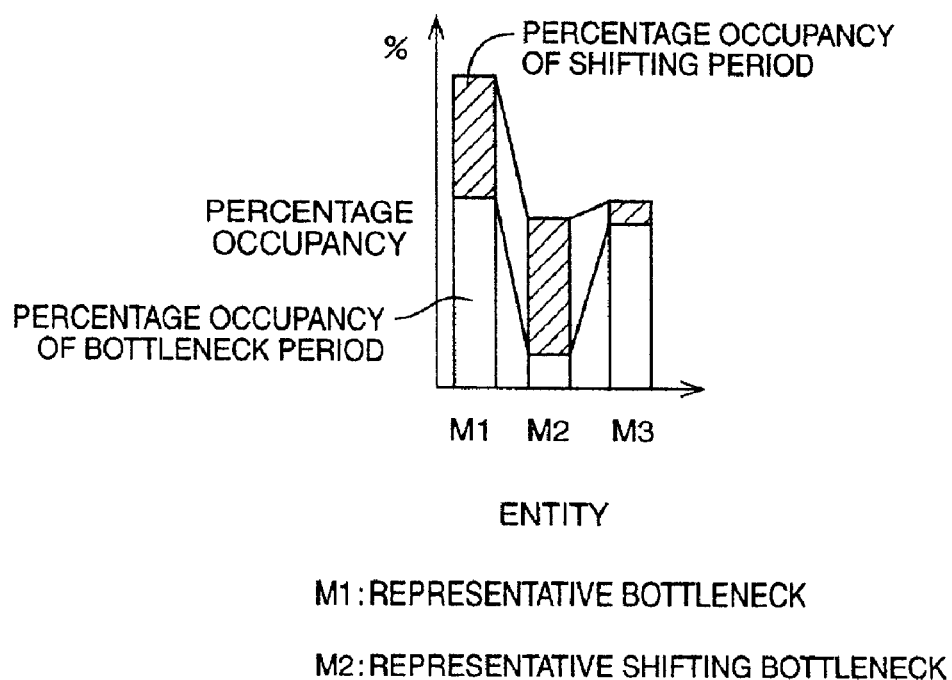
FIG. 24 is another graph for illustratively explaining the system-entity-effect-level determination program indicated in FIG. 22.

Subsequently, in step S133, a bottleneck-period-percentage-occupancy indicative of the percentage of the bottleneck period occupying the designated analysed period is calculated by dividing by the length of the designated analysed period the calculated sum for the bottleneck period described above. Further, a shifting-period-percentage-occupancy indicative of the percentage of the shifting period occupying the designated analysed period is calculated by dividing by the length of the designated analysed period the calculated sum for the shifting period described above. FIG. 24 shows the calculations of the above bottleneck-period-percentage-occupancy and shifting-period-percentage-occupancy for the example illustrated in FIG. 23.

Thereafter, in step S134, the entity the calculated bottleneck-period-percentage-occupancy of which is the largest among all the entities is determined as the aforementioned representative bottleneck. Further, the entity the calculated shifting-period-percentage-occupancy of which is the largest among all the entities is determined as the aforementioned representative shifting bottleneck. It follows that, for the example illustrated in FIG. 24, entity M1 is determined as the representative bottleneck, while entity M2 is determined as the representative shifting bottleneck.

Then, one cycle of execution of this program is terminated.

It is noted that while this embodiment employs the bottleneck-period-percentage-occupancy as an example of a representative value representing the length of at least one bottleneck period within the designated analysed period, it may employ the sum of the length of the at least one bottleneck period as an alternative example of the above representative value. This means that the employment of the ratio or rate is not essential in carrying out the present invention. This idea may be adapted for the shifting period.

It is further added that while this embodiment compares entities of the system so as to separate the bottleneck period and the shifting period each other, the present invention may be practiced in such a manner as to compare the entities without separating the bottleneck period and the shifting period each other.

While the above manner may be embodied, such that, for example, the representative value for the bottleneck period and the shifting period are calculated by simply summing the lengths of these two periods, the above manner may be also embodied, such that the above calculation is performed by summing the lengths of these two periods after individually considering these two periods in terms of the importance (i.e., the weight) of each period.

In the latter case, provided that the weight of the bottleneck period is set to "1", while the weight of the shifting period is set to "0.5," the above representative value may be calculated so as to add the length of the bottleneck period as such to the product of the length of the shifting period as such and the weight "0.5."

As will be readily understood from the above description, in this embodiment, step S121 indicated in FIG. 22 constitutes one example of the "collecting step" set forth in the above mode (1), step S122 constitutes one example of the "classifying step" set forth in the same mode, part of step S126 constitutes one example of the "active-time determining step" set forth in the same mode, and steps S124 and S125, the remaining part of step S126, and steps S127 to S134 together constitute one example of the "effect-level determining step" set forth in the same mode.

Further, in this embodiment, steps S124 and S125, the remaining part of step S126, and steps S127 to S134 all indicated in FIG. 22 together constitute one example of the "effect-level determining step" set forth in the above mode (2).

Still further, in this embodiment, part of step S126 indicated in FIG. 22 constitutes one example of the "bottleneck determining step" set forth in any one of the above modes (8), (17) to (21), and (30) to (34).

Yet further, in this embodiment, step S128 indicated in FIG. 22 constitutes one example of the "shifting bottleneck determining step" set forth in the above modes (22) or (23).

Additionally, in this embodiment, part of step S126 indicated in FIG. 22 constitutes one example of the "bottleneck determining step" set forth in the above modes (28), and another part of step S126 constitutes one example of the "active-period determining step" set forth in the same mode.

Further, in this embodiment, steps S132 and S133 indicated in FIG. 22 together constitute one example of the "bottleneck-period-representative-value calculating step" set forth in the above modes (39), and step S134 constitutes one example of the "representative bottleneck determining step" set forth in the same mode and the above mode (40).

Still further, in this embodiment, steps S132 and S133 indicated in FIG. 22 together constitute one example of the "shifting-period-representative-value calculating step" set forth in the above modes (41), and step S134 constitutes one example of the "representative shifting bottleneck determining step" set forth in the same mode and the above mode (42).

There will be next described a seventh embodiment of the present invention.

This embodiment is different from the second embodiment in a system-entity-effect-level determination program as a software element, and identical with the second embodiment in hardware elements. With this in mind, the same reference numerals as used in the second embodiment will be used in this embodiment to identify the functionally corresponding elements in the interest of simplification of the following description, and only the system-entity-effect-level determination program will be described.

This embodiment is implemented, like the second embodiment, such that, during actual operation of a non steady state system, at least one of entities together constituting the non steady state system which at least one functions as the bottleneck is detected in real time in association with an analysis reference time designated by a user of the computer system 10. That is, a real time analysis is performed.

This embodiment, like the second embodiment, performs a bottleneck analysis using data continuously updated as the operation of the non steady state system progresses. Under this situation, there is therefore unknown the termination time of the active period for the entity considered for the bottleneck analysis, which is to say, the currently active entity.

However, this embodiment predicts the above termination time by a simulation analysis. Consequently, this embodiment performs the above real time analysis while considering the predicted future statuses of each entity.

Figure 25:
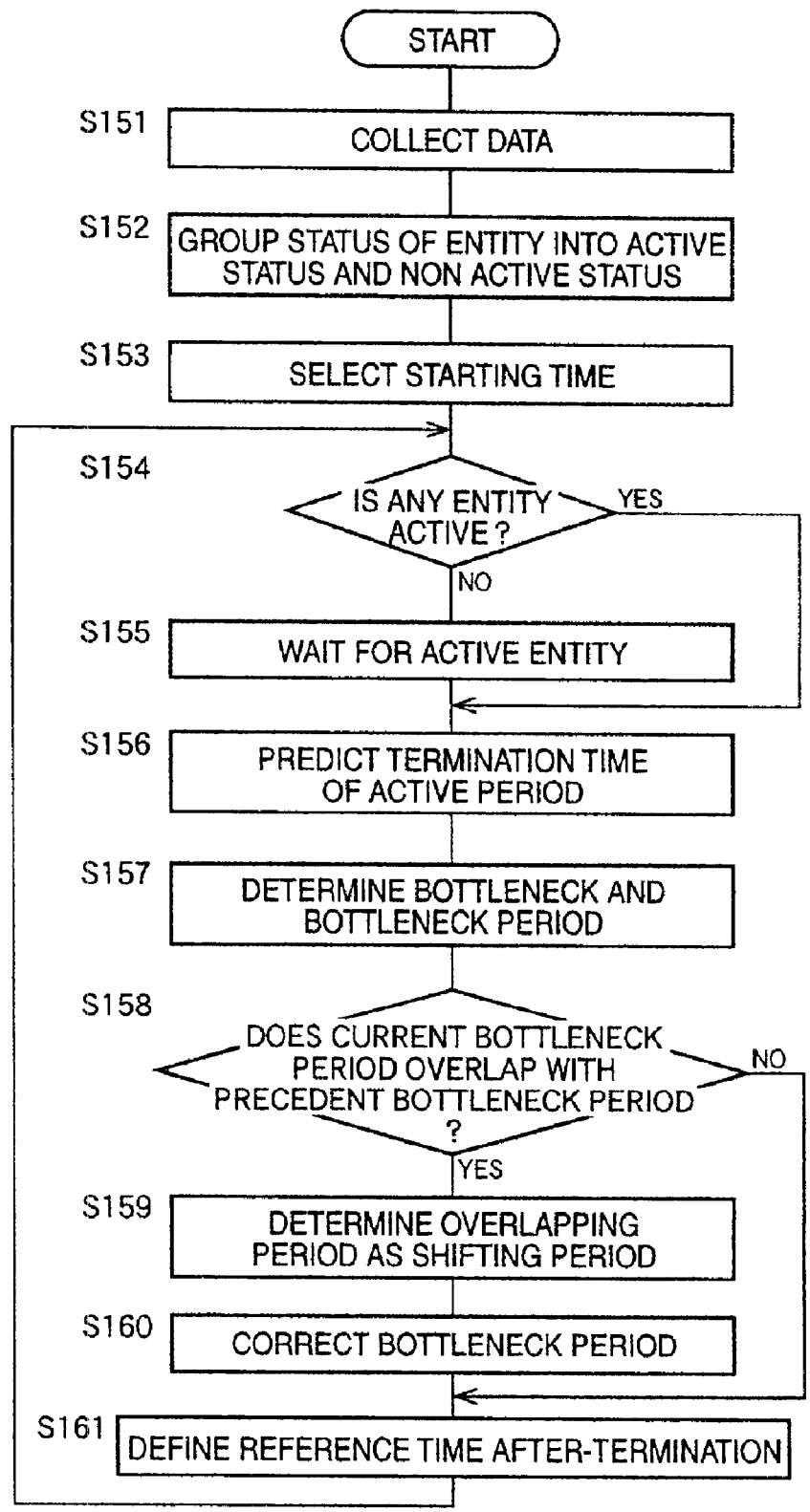
FIG. 25 is a flow chart schematically illustrating a system-entity-effect-level determination program executed for implementing a system-entity-effect-level determining method constructed according to a seventh embodiment of the present invention.

Referring then to FIG. 25, there is schematically illustrated with a flow chart a system-entity-effect-level determination program included in this embodiment.

This program is basically identical with the system-entity-effect-level determination program included in the second embodiment.

With this in mind, this program will be below described simply for the identical steps, and in detail for the different steps.

This program is initiated with steps S151 to S155 to be executed like steps S31 to S35 indicated in FIG. 9.

Subsequently, step S156 is implemented for predicting through by-simulation analysis the termination time of the active period for at least one entity. This prediction may be performed, for example, according to which known rule the same entity is to be followed in changing its status, and on the basis of the current status of the same entity.

This embodiment obtains by its simulation analysis, irrespective of its real time analysis, the termination time of the active period considered for performing the real time analysis, even if the termination time has not yet arrived. This embodiment is therefore implemented, like the aforementioned historical/by-simulation analysis, to perform determination of the active times; determination of the bottlenecks; determination of the bottleneck periods; determination of the shifting periods; and correction of the bottleneck periods.

For this end, steps S157 to S161 are implemented like steps S56 to S60 indicated in FIG. 16 illustrating the fourth embodiment.

Figure 26:
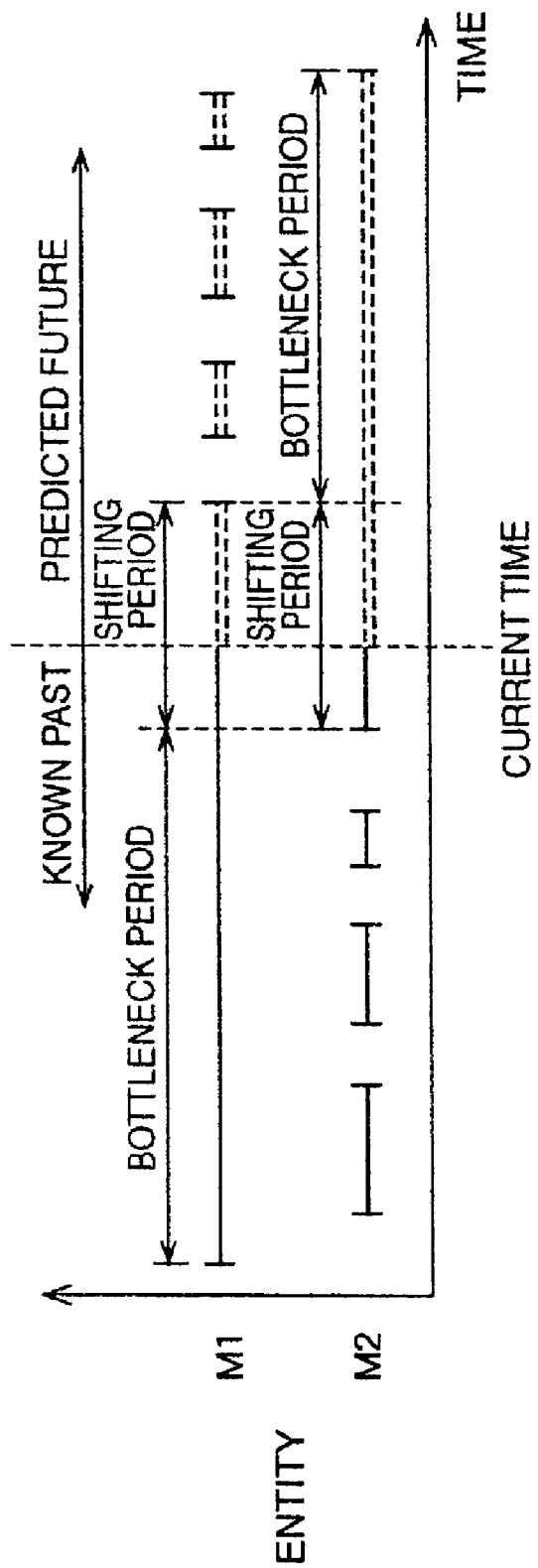
FIG. 26 is a graph for illustratively explaining the system-entity-effect-level determination program indicated in FIG. 25.
Figure 27:
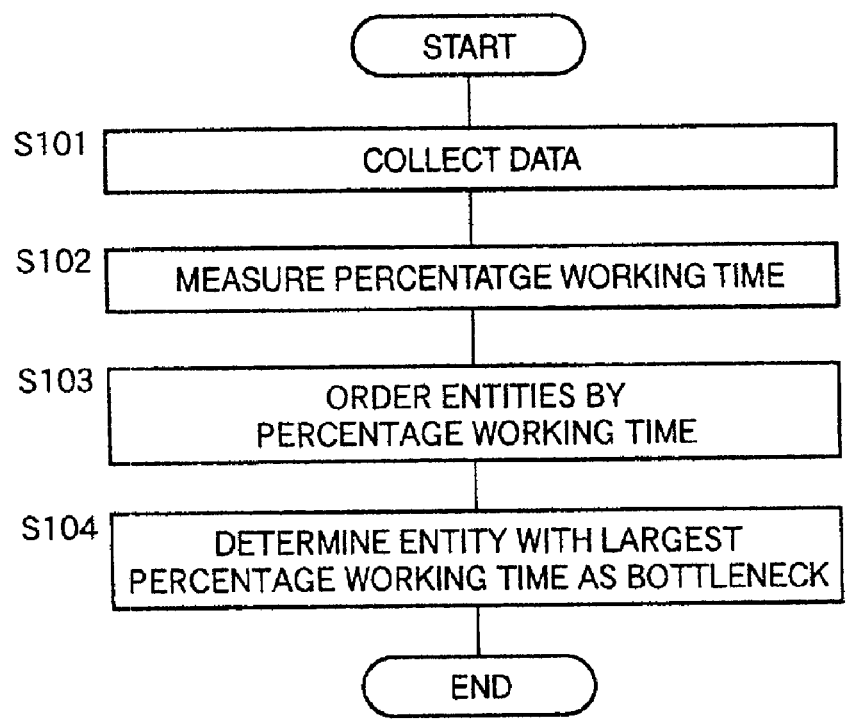
FIG. 27 is a flow chart schematically illustrating one conventional method of determining at least one of a plurality of entities constituting a system, which at least one constitutes at least one bottleneck of the system.

Referring next to FIG. 26, there is schematically illustrated with a graph an example of the results from the execution of this program.

As will be readily understood from the above description, in this embodiment, step S151 indicated in FIG. 25 constitutes one example of the "collecting step" set forth in the above mode (1), step S152 constitutes one example of the "classifying step" set forth in the same mode, step S156 and part of step S157 together constitute one example of the "active-time determining step" set forth in the same mode, and steps S154 to S156, the remaining part of step S157, and steps S158 to S161 together constitute one example of the "effect-level determining step" set forth in the same mode.

Further, in this embodiment, steps S154 to S156, the remaining part of step S157, and steps S158 to S161 all indicated in FIG. 25 together constitute one example of the "effect-level determining step" set forth in the above mode (2).

Still further, in this embodiment, part of step S157 indicated in FIG. 25 constitutes one example of the "bottleneck determining step" set forth in any one of the above modes (8), (17) to (21), and (30) to (34).

Yet further, in this embodiment, step S159 indicated in FIG. 25 constitutes one example of the "shifting bottleneck determining step" set forth in the above modes (22) or (23).

Additionally, in this embodiment, part of step S157 indicated in FIG. 25 constitutes one example of the "bottleneck determining step" set forth in the above modes (29), and step S156 constitutes one example of the "active-period predicting step" set forth in the same mode.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of determining a level at which each one of a plurality of entities together constituting a system in which each one of the plurality of entities changes in status with time, affects a performance of the system, comprising:
   a collecting step of collecting data representative of change in status of the each entity;
   a qualifying step of qualifying, on the basis of the collected data, the status of the each entity at each one of discrete points of time, as a corresponding one of an active and an inactive status;
   an active-time determining step of determining as an active time a length of an active period in which the each entity is situated without interruption in the active status; and
   an effect-level determining step of determining, on the basis of a time magnitude relationship between the plurality of entities with respect to the determined active time, the level at which the each entity affects the performance of the system.

2. The method according to claim 1, wherein the effect-level determining step is implemented to compare the plurality of entities with respect to the active time determined in the active-time determining step, and to determine, on the basis of results from the comparison, the effect-level of the each entity on the performance of the system.

3. The method according to claim 1, wherein the effect-level determining step comprises:
   a bottleneck determining step of determining, on the basis of a time magnitude relationship between the plurality of active times determined in the active-time determining step for the plurality of entities at each one of a plurality of discrete points of time, at least one of the plurality of entities which affects the performance of the system at a higher level than other entities, as at least one bottleneck.

4. A computer program to be executed by a computer to implement the method according to claim 1.

5. A computer-readable storage medium having stored therein the computer program according to claim 4.

6. The method according to claim 1, wherein the effect-level determining step comprises a bottleneck determining step of determining at least one of the plurality of entities as at least one bottleneck which affects the performance of the system at a higher level than other entities.

7. The method according to claim 6, wherein the bottleneck determining step comprises a step of determining one of the plurality of entities which one has the longest active time among the plurality of entities, as one bottleneck affecting the performance of the system more strongly than other entities.

8. The method according to claim 6, wherein the system is of a steady type in which the same at least one of the plurality of entities is kept qualifying as the at least one bottleneck of the system as time elapses.

9. The method according to claim 6, wherein the active-time determining step comprises:
   a representative-active-time determining step of determining, for the each entity, as a representative active time, a representative value of a plurality of active times of a plurality of active periods which are discrete in time, wherein
   the bottleneck determining step is implemented to determine, on the basis of a time magnitude relationship between the plurality of entities with respect to the determined representative active time, at least one of the plurality of entities which functions as the at least one bottleneck.

10. The method according to claim 9, wherein the effect-level determining step comprises:

an accuracy determining step of determining, for the each entity, an accuracy of the determined representative active time, wherein the bottleneck determining step is implemented to determine at least one of the plurality of entities which functions as the at least one bottleneck, on the basis of the determined accuracy and the determined representative active time.

11. The method according to claim 1, wherein the effect-level determining step comprises:

a bottleneck determining step of determining at least one of the plurality of entities as at least one bottleneck which affects the performance of the system at a higher level than other entities at a given point in time.

12. The method according to claim 11, further comprising a shifting bottleneck determining step of determining, on the basis of an overlap with respect to the active period between ones of the plurality of entities which ones have been determined as a plurality of bottlenecks, at least one of the ones which at least one performs a shifting of the bottleneck, as at least one shifting bottleneck.

13. The method according to claim 11, wherein the bottleneck determining step is implemented to determine at least one of the plurality of entities which functions as the at least one bottleneck at a current point in time, during operation of the system, the collected data is sequentially updated as the operation of the system progresses, thereby representing a manner in which the each entity changes in status with time, during a past period and the current point in time, not during a future period, the active-time determining step comprises an active-period predicting step of predicting by simulation the active time for at least one of the plurality of entities which is situated in the active status at the current point in time, on the basis of the collected data, and the bottleneck determining step is implemented to determine the at least one bottleneck, on the basis of the collected data and the predicted active time.

14. The method according to claim 11, wherein the bottleneck determining step is implemented to determine, on the basis of the collected data, at least one of the plurality of entities which functions as the at least one bottleneck; and a bottleneck period which is a duration of the at least one bottleneck, the method further comprising:

a bottleneck-period-representative-value calculating step of calculating, after some bottleneck periods have been determined in the bottleneck determining step for the each entity, a representative value which represents time lengths of some of the determined some bottleneck periods which some belong to a designated analysis period, for the each entity; and a representative-bottleneck determining step of determining, on the basis of a time magnitude relationship between some representative values calculated in the bottleneck-period-representative-value calculating step, a representative bottleneck of the plurality of entities during the designated analysis period.

15. The method according to claim 11, further comprising:

a shifting bottleneck determining step of determining at least one of the plurality of entities which functions as at least one shifting bottleneck, on the basis of an overlap of the active periods of some of the plurality of entities which some have been determined as the at least one bottleneck; and of further determining a shifting period which is a duration of the determined at least one shifting bottleneck;

a shifting-period-representative-value calculating step, implemented after some shifting periods have been determined in the shifting bottleneck determining step for the each entity, of calculating, for the each entity, a representative value representing some of the determined some shifting periods which some belong to a designated analysis period; and a representative-shifting-bottleneck determining step of determining a representative shifting bottleneck representing the plurality of entities during the designated analysis period, on the basis of magnitude relationship between representative values which have been calculated for a the each entity in the shifting-period-representative-value calculating step.

16. The method according to claim 11, wherein the bottleneck determining step is implemented to determine in real time at least one of the plurality of entities which functions as the at least one bottleneck at a current point in time, during operation of the system, the collected data is updated as the operation of the system progresses, whereby the collected data is representative of a manner in which the each entity changes in status with time, during a past period and the current point in time, not during a future period, and the active-time determining step comprises an active-period determining step, operable when the each entity is situated in the active status at the current point in time, of determining on the basis of the collected data a period from a starting point in time at which the active status starts up to the current point in time, as the active period of the each entity.

17. The method according to claim 16, wherein the bottleneck determining step is implemented, such that, after at least one of the plurality of entities has been determined as the at least one bottleneck, a bottleneck period which is a duration of the at least one bottleneck is not subject to any later correction based on the data collected after determination of the at least one bottleneck.

18. The method according to claim 11, wherein the bottleneck determining step is implemented to determine at least one of the plurality of entities which functions as the least one bottleneck at a given point in time, for an actual past operation, or an analyzed past operation by simulation, of the system, the collected data is representative of a manner in which the each entity changes in status with time, not only during a past period before the given point in time, but also during a future period after the given point in time, and the active-time determining step comprises an active-period determining step of determining, on the basis of the collected data, a period from a starting time at which the active status starts up to a termination time at which the active status is terminated, as the active period for the each entity.

19. The method according to claim 18, wherein the bottleneck determining step is implemented to determine at least one of the plurality of entities as the at least one bottleneck, thereby determining at a determination time a duration of the at least one bottleneck as a bottleneck period, and to subsequently correct the determined bottleneck period, on the basis of data representative of a behavior of the system shown after the determination time.

20. The method according to claim 11, wherein the bottleneck determining step is implemented, for at least one of the plurality of entities which is situated in the active status at the given point in time, such that at least one of the plurality of entities which functions as the at least one bottleneck is determined on the basis of a time magnitude relationship between the at least on active time determined in the active-time determining step.

21. The method according to claim 20, wherein the bottleneck determining step is implemented to determine an with-maximum-active-time entity which is one of the at least one of the plurality of entities which at least one is situated in the active status at the given point in time, as the bottleneck, wherein the with-maximum-active-time entity has substantially the longest active time among the at least one of the plurality of entities.

22. The method according to claim 20, wherein the bottleneck determining step is implemented to further determine a bottleneck period which is a duration of the at least one bottleneck, on the basis of the collected data.

* * * * *